US010529170B2

(12) United States Patent
Keilwert et al.

(10) Patent No.: US 10,529,170 B2
(45) Date of Patent: *Jan. 7, 2020

(54) WAGERING GAMING APPARATUS FOR DETECTING USER INTERACTION WITH GAME COMPONENTS IN A THREE-DIMENSIONAL DISPLAY

(71) Applicant: IGT CANADA SOLUTIONS ULC, Moncton (CA)

(72) Inventors: Stefan Keilwert, St. Josef (AT); Franz Pierer, Kainbach (AT); Sven Aurich, Hollenegg (AT)

(73) Assignee: IGT CANADA SOLUTIONS ULC, Moncton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/983,575

(22) Filed: May 18, 2018

(65) Prior Publication Data

US 2018/0276939 A1    Sep. 27, 2018

Related U.S. Application Data

(63) Continuation of application No. 14/821,678, filed on Aug. 7, 2015, now Pat. No. 9,978,202, which is a (Continued)

(51) Int. Cl.
*A63F 13/00* (2014.01)
*G07F 17/32* (2006.01)
(Continued)

(52) U.S. Cl.
CPC .......... *G07F 17/3211* (2013.01); *G06T 17/00* (2013.01); *G06T 19/003* (2013.01);
(Continued)

(58) Field of Classification Search
None
See application file for complete search history.

(56) References Cited

U.S. PATENT DOCUMENTS

| 8,553,935 B2 * | 10/2013 | Mandella | G01B 21/04 382/103 |
| 2009/0209343 A1 * | 8/2009 | Foxlin | G07F 17/32 463/36 |
| 2013/0267317 A1 * | 10/2013 | Aoki | G07F 17/3206 463/32 |

OTHER PUBLICATIONS

"Head Tracking for Desktop Virtual Reality Displays using the Wii Remote", [dated 2007], [online], [retrieved Jul. 24, 2017]. Retrieved from the Internet <URL:https://www.youtube.com/watch?v=Jd3-eiid-Uw>. 1 page.*

(Continued)

*Primary Examiner* — Lawrence S Galka
(74) *Attorney, Agent, or Firm* — Sage Patent Group

(57) ABSTRACT

A wagering gaming apparatus is provided, comprising a 3-dimensional (3D) display device configured to create for a player a visual illusion of a 3D scene for a wagering game, the 3D scene having perceived depth in a z-direction perpendicular to a physical screen having width in an x-direction and height in a y-direction; one or more sensor devices configured to sense a physical location of one or more anatomical features of the player; at least one processor; and at least one non-transitory processor-readable storage medium storing processor-executable instructions. The processor-executable instructions, when executed by the at least one processor, cause the at least one processor to perform various adjustments regarding the 3D scene based on the sensed physical location of an anatomical feature of the player.

18 Claims, 26 Drawing Sheets

Related U.S. Application Data continuation-in-part of application No. 14/746,621, filed on Jun. 22, 2015, now Pat. No. 9,799,159, which is a continuation-in-part of application No. 14/181,533, filed on Feb. 14, 2014, now Pat. No. 9,558,610.

(51) Int. Cl.

| | | |
|---|---|---|
| *G06T 17/00* | (2006.01) | |
| *G06T 19/00* | (2011.01) | |
| *H04N 13/156* | (2018.01) | |
| *H04N 13/282* | (2018.01) | |
| *H04N 13/332* | (2018.01) | |
| *H04N 13/366* | (2018.01) | |
| *H04N 13/30* | (2018.01) | |

(52) U.S. Cl.
CPC ........ *G06T 19/006* (2013.01); *G07F 17/3206* (2013.01); *G07F 17/3209* (2013.01); *G07F 17/3227* (2013.01); *H04N 13/156* (2018.05); *H04N 13/282* (2018.05); *H04N 13/332* (2018.05); *H04N 13/366* (2018.05); *G06T 2219/2016* (2013.01); *G06T 2219/2024* (2013.01); *H04N 2013/405* (2018.05)

(56) References Cited

OTHER PUBLICATIONS

"i3D—Head Tracking for iPad: Glasses-Free 3D Display", [dated 2011]. [online], [retrieved Jul. 24, 2017]. Retrieved from the Internet <URL:https://www.youtube.com/watch?v=bBQQEcfkHoE>. 1 page.*

* cited by examiner

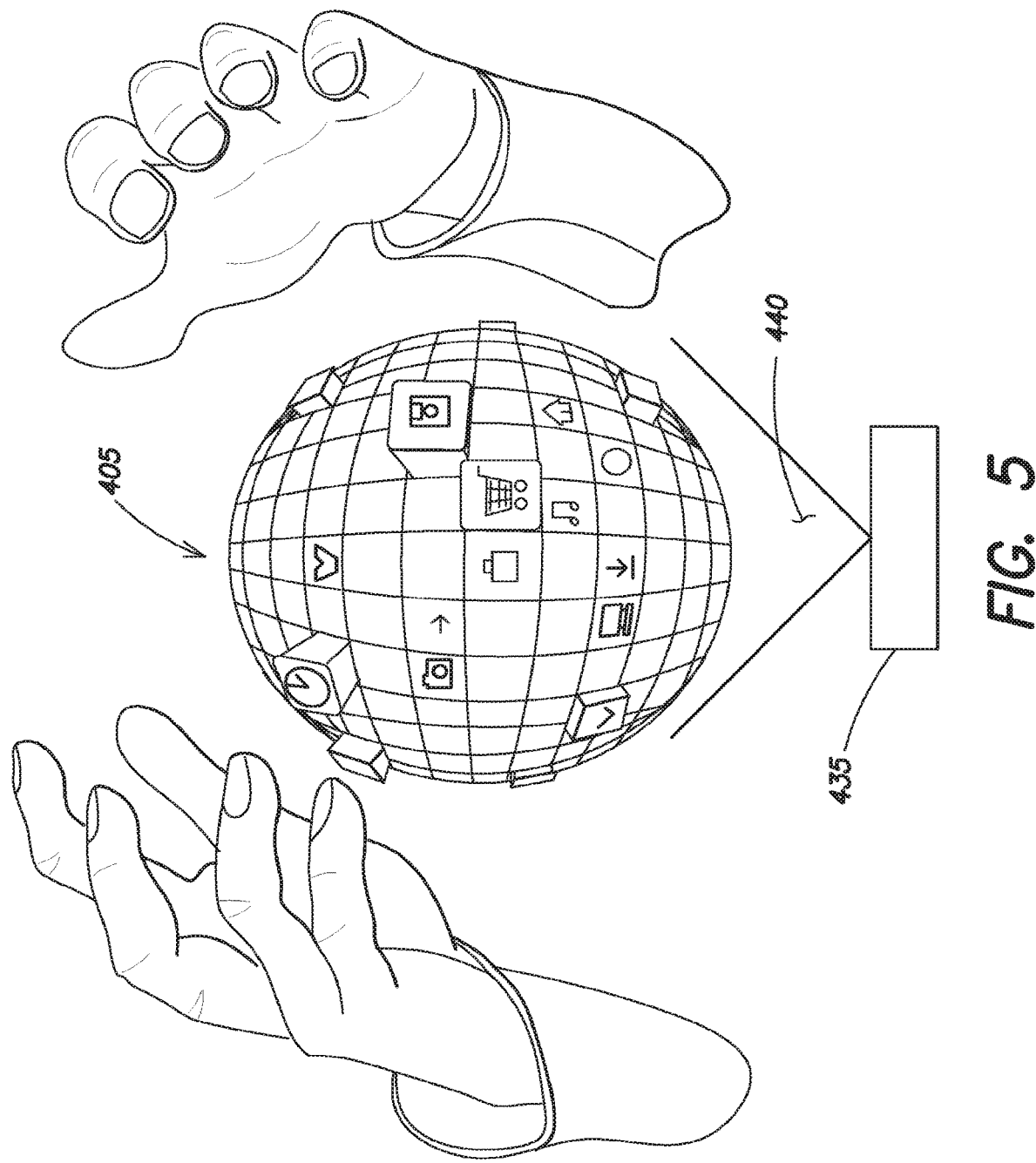

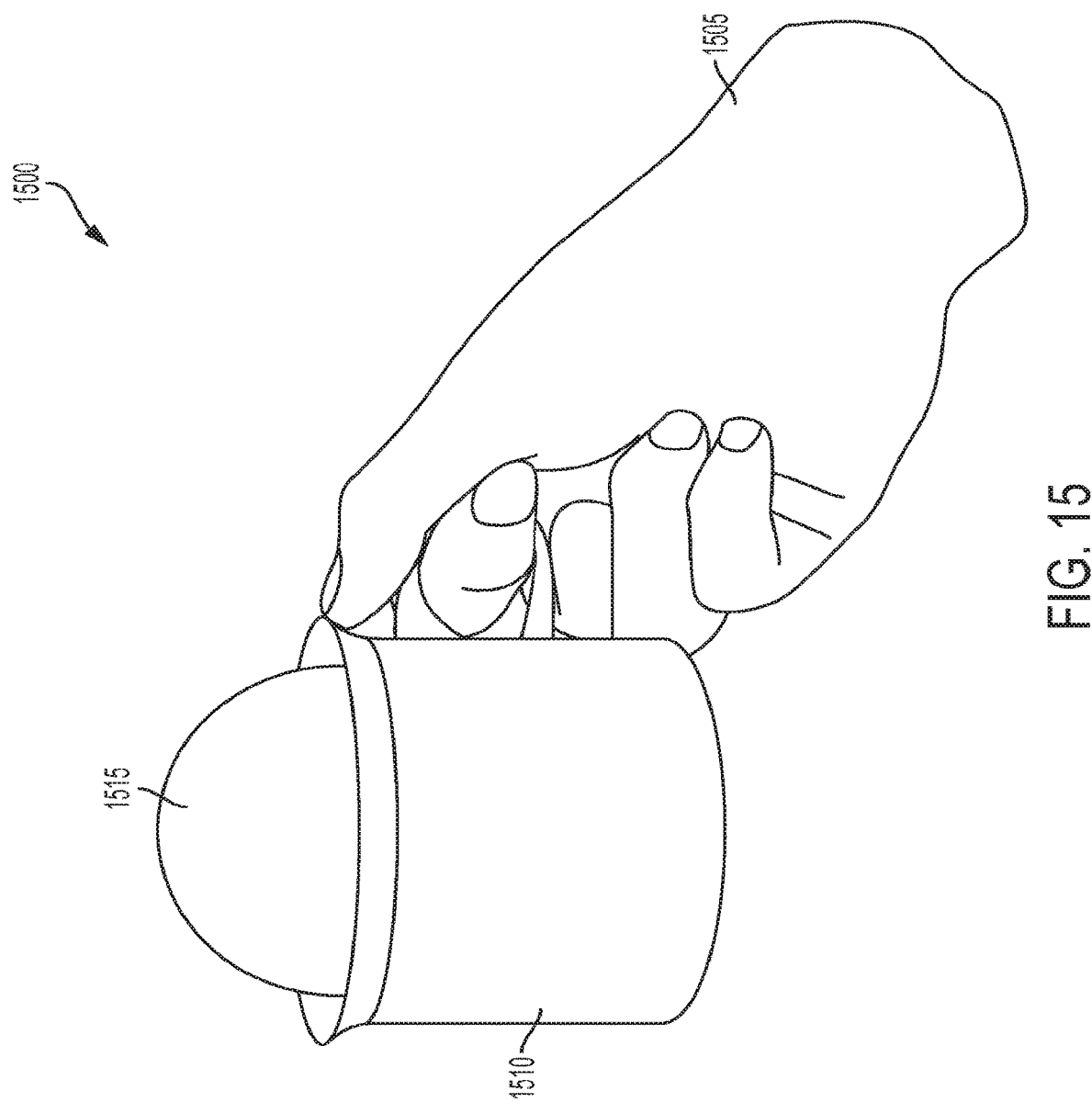

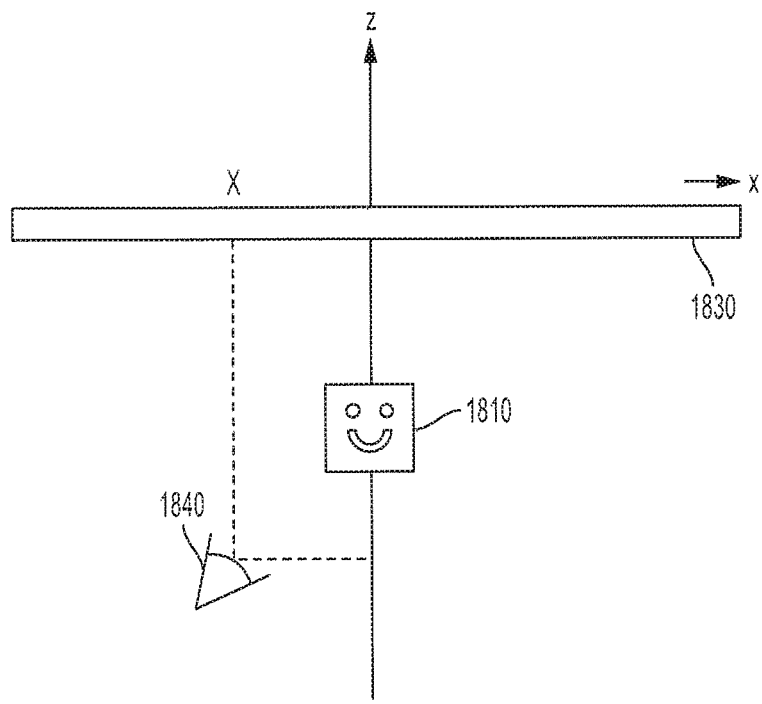
FIG. 19A
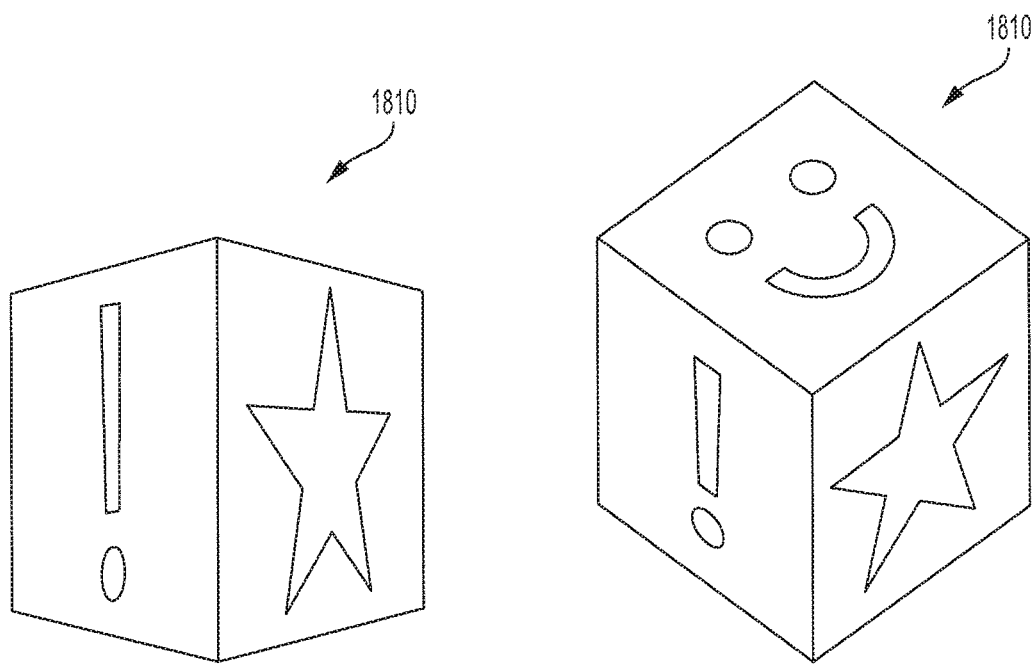
FIG. 19B
FIG. 19C

WAGERING GAMING APPARATUS FOR DETECTING USER INTERACTION WITH GAME COMPONENTS IN A THREE-DIMENSIONAL DISPLAY

CROSS REFERENCE TO RELATED APPLICATIONS

The present application is a continuation of U.S. patent application Ser. No. 14/821,678, filed Aug. 7, 2015, entitled "WAGERING GAMING APPARATUS FOR DETECTING USER INTERACTION WITH GAME COMPONENTS IN A THREE-DIMENSIONAL DISPLAY", which is a continuation-in-part of U.S. patent application Ser. No. 14/746,621, filed on Jun. 22, 2015, which is a continuation-in-part of U.S. patent application Ser. No. 14/181,533 filed on Feb. 14, 2014, the disclosures of which are incorporated herein in its entirety as set forth herein.

BACKGROUND

The present disclosure relates to the field of electronic gaining systems, such as on-line gaming and gaming systems in casinos.

Examples of gaining systems or machines include slot machines, online gaming systems (e.g., systems that enable users to play games using computer devices such as desktop computers, laptops, tablet computers, smart phones, etc.), computer programs for use on a computer device, gaming consoles that are connectable to a display such as a television, a computer screen, etc.

Gaming machines may be configured to enable users to play different types of games. For example, some games display a plurality of game components that are moving (e.g., symbols on spinning reels). The game components may be arranged in an array of cells, where each cell may include a game component. One or more particular combinations or patterns of game components in such an arrangement may be designated as "winning combinations" or "winning patterns." Games that are based on winning patterns may be referred to as "pattern games" in this disclosure.

One example of a pattern game is a game that includes spinning reels arranged in an array, where each reel may have a plurality of game components that come into view successively as the reel spins. A user may wager on one or more lines in the array and activate the game (e.g., by pushing a button). After the user activates the game, the spinning reels may be stopped to reveal a pattern of game components. The game rules may define one or more winning patterns, which may be associated with different numbers or combinations of credits, points, etc.

Other examples of games include card games such as poker, blackjack, gin rummy, etc., where game components (e.g., cards) may be arranged in groups to form the layout of a game (e.g., the cards that form a player's hand, the cards that form a dealer's hand, cards that are drawn to further advance the game, etc.). As another example, in a traditional Bingo game, the game components may include the numbers printed on a 5×5 matrix which the players must match against drawn numbers. The drawn numbers may also be game components.

SUMMARY

Systems, methods and apparatus are provided for three-dimensional (3D) display interaction for gaming systems.

One type of embodiment is directed to a wagering gaming apparatus comprising a 3-dimensional (3D) display device configured to create for a player a visual illusion of a 3D scene for a wagering game, the 3D scene having perceived depth in a z-direction perpendicular to a physical screen having width in an x-direction and height in a y-direction; a first sensor device configured to sense a physical location of a first anatomical feature of the player; a second sensor device configured to sense a physical location of a second anatomical feature of the player in close proximity to the 3D display device; at least one processor; and at least one non-transitory processor-readable storage medium storing processor-executable instructions that, when executed by the at least one processor, cause the at least one processor to perform: detecting a distance between an origin position on the screen and the physical location of the first anatomical feature of the player sensed by the first sensor device; generating the 3D scene as a view from a virtual 3D camera toward an origin position in a virtual 3D model comprising a plurality of virtual game components, the generating comprising locating the virtual 3D camera at a virtual camera location whose distance Z from the origin position in the virtual 3D model is specified based on the detected distance between the origin position on the screen and the physical location of the first anatomical feature of the player; mapping the virtual camera location to a physical location at coordinates $(x,y,z)=(0,0,Z)$ from the origin position on the screen, and computing corresponding coordinates for a location of a first virtual game component in the 3D scene; applying a transformation to (a) the coordinates of the first virtual game component and/or (b) the physical location of the second anatomical feature of the player sensed by the second sensor device, based on a difference between the mapped physical location of the virtual 3D camera and the physical location of the first anatomical feature of the player as sensed by the first sensor device, to compare the physical location of the second anatomical feature of the player and the location of the first virtual game component in a player-view space; and detecting an intended interaction between the second anatomical feature of the player and the first virtual game component when the physical location of the second anatomical feature of the player as sensed by the second sensor device approaches the location of the first virtual game component in the player-view space resulting front the transformation.

Another type of embodiment is directed to a wagering gaming apparatus comprising a 3-dimensional (3D) display device configured to create for a player a visual illusion of a 3D scene for a wagering game, the 3D scene having perceived depth in a z-direction perpendicular to a physical screen having width in an x-direction and height in a y-direction; at least one sensor device configured to sense a physical location of an anatomical feature of the player; at least one processor; and at least one non-transitory processor-readable storage medium storing processor-executable instructions that, when executed by the at least one processor, cause the at least one processor to perform: detecting a distance between an origin position on the screen and the physical location of the anatomical feature of the player sensed by the at least one sensor device; generating the 3D scene as a view from a virtual 3D camera toward an origin position in a virtual 3D model comprising a plurality of virtual game components, the generating comprising locating the virtual 3D camera at a virtual camera location whose distance from the origin position in the virtual 3D model is specified based on the detected distance between the origin position on the screen and the physical location of the anatomical feature of the player; detecting a change in the physical location of the anatomical feature of the player sensed by the at least one sensor device, resulting in a change in the distance between the origin position on the screen and the physical location of the anatomical feature of the player; and updating the 3D scene at least in part by changing the virtual camera location, at least in part by changing the virtual camera location's distance from the origin position in the virtual 3D model in accordance with the change in the distance between the origin position on the screen and the physical location of the anatomical feature of the player as sensed by the at least one sensor device.

Another type of embodiment is directed to a wagering gaming apparatus comprising a 3-dimensional (3D) display device configured to create for a player a visual illusion of a 3D scene for a wagering game, the 3D scene having perceived depth in a z-direction perpendicular to a physical screen having width in an x-direction and height in a y-direction; at least one sensor device configured to sense a viewpoint orientation of an anatomical feature of the player; at least one processor; and at least one non-transitory processor-readable storage medium storing processor-executable instructions that, when executed by the at least one processor, cause the at least one processor to perform: generating the 3D scene as a view from a virtual 3D camera having a viewpoint orientation toward an origin position in a virtual 3D model comprising a plurality of virtual game components; detecting a change in the viewpoint orientation of the anatomical feature of the player sensed by the at least one sensor device; and updating the 3D scene at least in part by changing the viewpoint orientation of the virtual 3D camera away from the origin position in the virtual 3D model, in accordance with the detected change in the viewpoint orientation of the anatomical feature of the player as sensed by the at least one sensor device.

Another type of embodiment is directed to a method for use with a 3-dimensional (3D) display device configured to create for a player a visual illusion of a 3D scene for a wagering game, the 3D scene having perceived depth in a z-direction perpendicular to a physical screen having width in an x-direction and height in a y-direction, the method comprising: sensing, with a first sensor device, a physical location of a first anatomical feature of the player; sensing, with a second sensor device, a physical location of a second anatomical feature of the player in close proximity to the 3D display device; detecting a distance between an origin position on the screen and the physical location of the first anatomical feature of the player sensed by the first sensor device; generating the 3D scene, via execution of stored instructions by at least one processor, as a view from a virtual 3D camera toward an origin position in a virtual 3D model comprising a plurality of virtual game components, the generating comprising locating the virtual 3D camera at a virtual camera location whose distance Z from the origin position in the virtual 3D model is specified based on the detected distance between the origin position on the screen and the physical location of the first anatomical feature of the player; mapping the virtual camera location to a physical location at coordinates (x,y,z)=(0,0,Z) from the origin position on the screen, and computing corresponding coordinates fix a location of a first virtual game component in the 3D scene; applying a transformation to (a) the coordinates of the first virtual game component and/or (b) the physical location of the second anatomical feature of the player sensed by the second sensor device, based on a difference between the mapped physical location of the virtual 3D camera and the physical location of the first anatomical feature of the player as sensed by the first sensor device, to compare the physical location of the second anatomical feature of the player and the location of the first virtual game component in a player-view space; and detecting an intended interaction between the second anatomical feature of the player and the first virtual game component when the physical location of the second anatomical feature of the player as sensed by the second sensor device approaches the location of the first virtual game component in the player-view space resulting from the transformation.

Another type of embodiment is directed to a method for use with a 3-dimensional (3D) display device configured to create for a player a visual illusion of a 3D scene for a wagering game, the 3D scene having perceived depth in a z-direction perpendicular to a physical screen having width in an x-direction and height in a y-direction, the method comprising: sensing, with at least one sensor device, a physical location of an anatomical feature of the player; detecting a distance between an origin position on the screen and the physical location of the anatomical feature of the player sensed by the at least one sensor device; generating the 3D scene, via execution of stored instructions by at least one processor, as a view from a virtual 3D camera toward an origin position in a virtual 3D model comprising a plurality of virtual game components, the generating comprising locating the virtual 3D camera at a virtual camera location whose distance from the origin position in the virtual 3D model is specified based on the detected distance between the origin position on the screen and the physical location of the anatomical feature of the player; detecting a change in the physical location of the anatomical feature of the player sensed by the at least one sensor device, resulting in a change in the distance between the origin position on the screen and the physical location of the anatomical feature of the player; and updating the 3D scene at least in part by changing the virtual camera location, at least in part by changing the virtual camera location's distance from the origin position in the virtual 3D model in accordance with the change in the distance between the origin position on the screen and the physical location of the anatomical feature of the player as sensed by the at least one sensor device.

Another type of embodiment is directed to a method for use with a 3-dimensional (3D) display device configured to create for a player a visual illusion of a 3D scene for a wagering game, the 3D scene having perceived depth in a z-direction perpendicular to a physical screen having width in an x-direction and height in a y-direction, the method comprising: sensing, with at least one sensor device, a viewpoint orientation of an anatomical feature of the player; generating the 3D scene, via execution of stored instructions by at least one processor, as a view from a virtual 3D camera having a viewpoint orientation toward an origin position in a virtual 3D model comprising a plurality of virtual game components; detecting a change in the viewpoint orientation of the anatomical feature of the player sensed by the at least one sensor device; and updating the 3D scene at least in part by changing the viewpoint orientation of the virtual 3D camera away from the origin position in the virtual 3D model, in accordance with the detected change in the viewpoint orientation of the anatomical feature of the player as sensed by the at least one sensor device.

Another type of embodiment is directed to at least one non-transitory processor-readable storage medium storing processor-executable instructions that, when executed by at least one processor, perform a method for use with a 3-dimensional (3D) display device configured to create for a player a visual illusion of a 3D scene for a wagering game, the 3D scene having perceived depth in a z-direction perpendicular to a physical screen having width in an x-direction and height in a y-direction, the method comprising: sensing, with a first sensor device, a physical location of a first anatomical feature of the player; sensing, with a second sensor device, a physical location of a second anatomical feature of the player in close proximity to the 3D display device; detecting a distance between an origin position on the screen and the physical location of the first anatomical feature of the player sensed by the first sensor device; generating the 3D scene as a view from a virtual 3D camera toward an origin position in a virtual 3D model comprising a plurality of virtual game components, the generating comprising locating the virtual 3D camera at a virtual camera location whose distance Z from the origin position in the virtual 3D model is specified based on the detected distance between the origin position on the screen and the physical location of the first anatomical feature of the player; mapping the virtual camera location to a physical location at coordinates $(x,y,z)=(0,0,Z)$ from the origin position on the screen, and computing corresponding coordinates for a location of a first virtual game component in the 3D scene; applying a transformation to (a) the coordinates of the first virtual game component and/or (b) the physical location of the second anatomical feature of the player sensed by the second sensor device, based on a difference between the mapped physical location of the virtual 3D camera and the physical location of the first anatomical feature of the player as sensed by the first sensor device, to compare the physical location of the second anatomical feature of the player and the location of the first virtual game component in a player-view space; and detecting an intended interaction between the second anatomical feature of the player and the first virtual game component when the physical location of the second anatomical feature of the player as sensed by the second sensor device approaches the location of the first virtual game component in the player-view space resulting from the transformation.

Another type of embodiment is directed to at least one non-transitory processor-readable storage medium storing processor-executable instructions that, when executed by at least one processor, perform a method for use with a 3-dimensional (3D) display device configured to create for a player a visual illusion of a 3D scene for a wagering game, the 3D scene having perceived depth in a z-direction perpendicular to a physical screen having width in an x-direction and height in a y-direction, the method comprising: sensing, with at least one sensor device, a physical location of an anatomical feature of the player; detecting a distance between an origin position on the screen and the physical location of the anatomical feature of the player sensed by the at least one sensor device; generating the 3D scene as a view from a virtual 3D camera toward an origin position in a virtual 3D model comprising a plurality of virtual game components, the generating comprising locating the virtual 3D camera at a virtual camera location whose distance from the origin position in the virtual 3D model is specified based on the detected distance between the origin position on the screen and the physical location of the anatomical feature of the player; detecting a change in the physical location of the anatomical feature of the player sensed by the at least one sensor device, resulting in a change in the distance between the origin position on the screen and the physical location of the anatomical feature of the player; and updating the 3D scene at least in part by changing the virtual camera location, at least in part by changing the virtual camera location's distance from the origin position in the virtual 3D model in accordance with the change in the distance between the origin position on the screen and the physical location of the anatomical feature of the player as sensed by the at least one sensor device.

Another type of embodiment is directed to at least one non-transitory processor-readable storage medium storing processor-executable instructions that, when executed by at least one processor, perform a method for use with a 3-dimensional (3D) display device configured to create for a player a visual illusion of a 3D scene for a wagering game, the 3D scene having perceived depth in a z-direction perpendicular to a physical screen having width in an x-direction and height in a y-direction, the method comprising: sensing, with at least one sensor device, a viewpoint orientation of an anatomical feature of the player; generating the 3D scene as a view from a virtual 3D camera having a viewpoint orientation toward an origin position in a virtual 3D model comprising a plurality of virtual game components; detecting a change in the viewpoint orientation of the anatomical feature of the player sensed by the at least one sensor device; and updating the 3D scene at least in part by changing the viewpoint orientation of the virtual 3D camera away from the origin position in the virtual 3D model, in accordance with the detected change in the viewpoint orientation of the anatomical feature of the player as sensed by the at least one sensor device.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

FIG. 5 shows an illustrative example in which a virtual sphere is projected out of a display screen into a 3D space between the display screen and a player, in accordance with some embodiments.

FIG. 15 illustrates an example of a visual illusion that may be created by a gaining system, in accordance with some embodiments.

FIG. 19A is a top view of an exemplary physical 3D display of a 3D scene that may be created by a gaming system, in accordance with some embodiments.

FIGS. 19B and 19C illustrate exemplary 3D views of a virtual game component that may be created by a gaming system, in accordance with some embodiments.

DETAILED DESCRIPTION

Figure 1A:
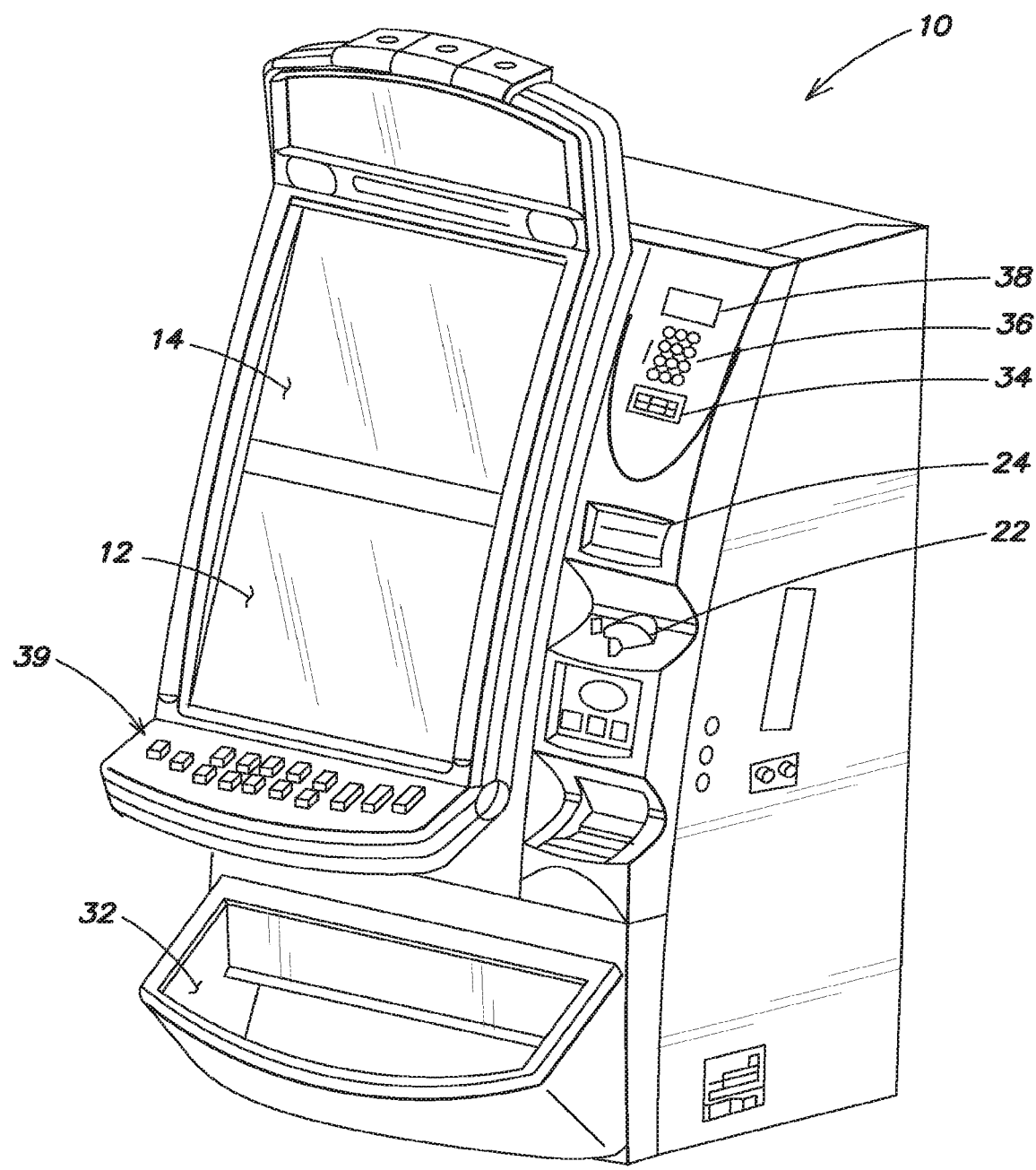
FIG. 1A is a perspective view of an illustrative electronic gaming machine (EGM) where a gesture input interface may be provided, in accordance with some embodiments.

Various input devices are used in electronic gaming systems to allow players to take actions in games. For example, to play a card game on a computer, a player may use a pointing device to click on buttons displayed on the computer's screen, where each button may correspond to a particular action the player can take (e.g., drawing a card, skipping a turn, etc.). The player may also use the pointing device to interact with a virtual object in a game (e.g., by clicking on a card to discard it or turn it over). Some pointing devices (e.g., joysticks, mice, touchpads, etc.) are separate from the display screen. Alternatively, a pointing device may be incorporated into the display screen (e.g., as in a touch screen), so that the player may interact with a game component by physically touching the display at a location where the game component is shown.

The inventors have recognized and appreciated that conventional input devices for electronic gaming systems may have limitations. For instance, in electronic versions of games that are traditionally played using physical game components, physical interactions with the game components (e.g., throwing dice in a dice game, pulling a lever on a slot machine, etc.) are often replaced by simple button clicking or pressing. The inventors have recognized and appreciated that clicking or pressing a button may not be sufficiently engaging to retain a player's attention after an extended period of play, and that a player may stay engaged longer if he could interact with the game components using the same gestures as if he were playing the traditional version of the game.

Furthermore, in some gaming systems, game components are visually projected out of a display screen and into a three-dimensional (3D) space between the display screen and a player (e.g., using autostereoscopy), while the display screen is a touch screen that allows the player to interact with the game components. As a result, when the player reaches for the touch screen to select a game component, it would appear to him visually that he is reaching through the game component that he intends to select. The inventors have recognized and appreciated that such a sensory mismatch may negatively impact user experience in playing the game. Therefore, it may be desirable to provide an input interface that allows a player to virtually touch a game component at the same location where the game component appears visually to the player.

Further still, the inventors have recognized and appreciated that the use of some conventional input devices in games may involve repeated activities that may cause physical discomfort or even injury to players. For example, prolonged use of a mouse, keyboard, and/or joystick to play games may cause repetitive strain injuries in a player's hands. As another example, a casino game cabinet may include a touch screen display located at or slightly below eye-level of a player seated in front of the display, so that the player may need to stretch his arm out to touch game components shown on the display, which may be tiring and may cause discomfort after an extended period of play. Therefore, it may be desirable to provide an input interface with improved ergonomics.

Further still, the inventors have recognized and appreciated that the use of conventional input devices such as mice and touch screens requires a player to touch a physical surface with his fingers. In a setting where a game console is shared by multiple players (e.g., at a casino), such a surface may harbor germs and allow them to spread from one player to another. Therefore, it may be desirable to provide a contactless input interface.

Accordingly, in some embodiments, an input interface for gaming systems is provided that allows players to interact with game components in a contactless fashion. For example, one or more contactless sensor devices may be used to detect gestures made by a player (e.g., using his hands and/or fingers), and the detected gestures may be analyzed by a computer and mapped to various actions that the player can take in a game. The designer of a game may define any suitable gesture as a gesture command that is recognizable by the gaming system. Advantageously, in defining gesture commands, the designer can take into account various factors such as whether certain gestures make a game more interesting, feel more natural to players, are less likely to cause physical discomfort, etc.

In some embodiments, an input interface for gaming systems is provided that detects gestures by acquiring, analyzing, and understanding images. For example, an imaging device may be used to acquire one or more images of a player's hand. The imaging device may use any suitable combination of one or more sensing techniques, including, but not limited to, optical, thermal, radio, and/or acoustic techniques. Examples of imaging devices include, but are not limited to, the Leap Motion™ Controller by Leap Motion, Inc. and the Kinect™ by Microsoft Corporation.

The images that are acquired and analyzed to detect gestures may be still images or videos (which may be timed-sequences of image frames). Accordingly, in some embodiments, a gesture command may be defined based on location and/or orientation of one or more anatomical features of a player at a particular moment in time, and/or one or more aspects of a movement of the one or more anatomical features over a period of time.

In some embodiments, images that are acquired and analyzed to detect gestures may be in any suitable number of dimensions, such as 2 dimensions (2D) or 3 dimensions (3D). The inventors have recognized and appreciated that image data in 3D may provide additional information depth information) that can be used to improve recognition accuracy. For example, if the imaging device is placed under a player's hand, a downward clicking gesture made by a finger may be more easily detected based on depth information (e.g., a change in distance between the fingertip and the imaging device). However, the use of 3D image data is not required, as 2D image data may also be suitable.

In some embodiments, a gaming system may include a contactless input interface in combination with a 3D display to enhance a player's experience with a game. For example, a 3D display technique may be used to visually project game components (e.g., buttons, cards, tiles, symbols, figures, etc.) out of a screen of a display device and into a 3D space between the screen and a player. The 3D display technique may or may not require the player to wear special glasses. The contactless interface may allow the player to interact with the game components by virtually touching them. For example, to virtually push a button, the player may extend his arm so his hand or finger reaches a location in the 3D space between the screen and the player where the button visually appears to the player. A corresponding action may be triggered in the game as soon as the player's hand or finger reaches the virtual button, or the player may trigger the action by making a designated gesture (e.g., a forward tap) in midair with his hand or finger at the location of the virtual button. As discussed above, any suitable gesture may be defined as a gesture command that is recognizable by the gaming system, including, without limitation, finger gestures such as forward tap, downward click, swipe, circle, pinch, etc., and/or hand gestures such as side-to-side wave, downward pat, outward flick, twist, moving two hands together or apart, etc. A gesture may involve a single finger or multiple fingers, and likewise a single hand or multiple hands, as aspects of the present disclosure are not limited to any particular number of fingers or hands that are used in a gesture.

White in various embodiments described herein a gaming system includes a 3D display, it should be appreciated that a 3D display is not required, as a contactless input interface may be also used in combination with a 2D display, or even a non-visual (e.g., auditory, tactile, olfactory, etc.) display, or no display at all.

In some embodiments, a gaming system may be configured to track a movement of an anatomical feature of a player, such as the player's hand, finger, etc., and analyze any suitable combination of one or more aspects of the movement to identify an input command intended by the player. For instance, the gaming system may be configured to analyze a sequence of image frames and determine a starting location, ending location, intermediate location, duration, distance, direction, speed, acceleration, and/or any other relevant characteristics of a motion of the player's hand or finger.

In one non-limiting example, a player may throw a pair of dice virtually, and the gaming system may be configured to analyze a distance, direction, speed, acceleration, etc. of the motion of the player's hand to determine where and on which sides the virtual dice should land. In another example, a player may shoot a roulette ball virtually, and the gaming system may be configured to analyze a distance, direction, speed, acceleration, etc. of the motion of the player's hand to determine in which slot the roulette ball should fall. In yet another example, a player may use his hand to spin a virtual wheel, and the gaining system may be configured to analyze a distance, direction, speed, acceleration, etc. of the motion of the player's hand to determine how quickly the wheel should spin. In yet another example, a player may use his hands and/or fingers to play a virtual musical instrument (e.g., piano, drum, harp, cymbal, etc. and the gaming system may be configured to analyze the motion of the player's hand to determine what notes and/or rhythms the player played and the game payout may be varied accordingly.

It should be appreciated that the-above described examples are merely illustrative, as aspects of the present disclosure are not limited to the use of motion analysis in determining an outcome of a game. In some embodiments, a player's motion may merely trigger an action in a game (e.g., to throw a pair of dice, to shoot a roulette ball, to spin a wheel, etc.), and the outcome may be randomized according to a certain probability distribution (e.g., a uniform or non-uniform distribution over the possible outcomes).

In some embodiments, a gaming system may be configured to use one or more thresholds to determine whether a detected motion is to be interpreted as a gesture command. Such thresholds may be selected to distinguish unintentional movements from movements that are actually intended by a player as gesture commands. For instance, a combination of one or more thresholds may be selected so that a sufficiently high percentage of movements intended as a particular gesture command will be recognized as such, while a sufficiently low percentage of unintentional movements will be misrecognized as that gesture command. As an example, a downward movement of a finger may be interpreted as a downward click only if the distance moved exceeds a selected distance threshold and the duration of the movement does not exceed a selected duration threshold. Thus, a quick and pronounced movement may be recognized as a click, while a slow or slight movement may not be.

The inventors have recognized and appreciated that different players may move their hands and/or fingers differently even when they intend the same gesture command. Accordingly, in some embodiments, the gaming system may be configured to dynamically adapt one or more thresholds for determining whether a detected movement is to be interpreted as a gesture command. In one non-limiting example, the gaming system may be configured to collect and analyze information relating to how a particular player moves his hands and/or fingers when issuing a particular gesture command, and may adjust one or more thresholds for that gesture command accordingly. In another example, the gaming system may be configured to collect and analyze information relating to how differently a particular player moves his hands and/or fingers when issuing two confusable gesture commands, and may adjust one or more thresholds for distinguishing movements intended as the first command from those intended as the second command.

It should be appreciated that personal threshold values are merely one example of player-specific information that may be collected and used by a gaming system. Other examples include, but arr not limited to, preference information, history information, etc. However, it should also be appreciated that aspects of the present disclosure are not limited to the collection or use of player-specific information. In some embodiments, no such information may be collected or used at all. In some embodiments, player-specific information may only be collected and/or used during the same session of game play. For example, as long as a player remains at a gaming station, player-specific information such as personal threshold values may be collected and used to improve user experience, but no such information may be maintained after the player leaves the station, even if the player may later return to the same station.

In some embodiments, rather than identifying a player uniquely and accumulating information specific to that player, a gaming system may apply one or more clustering techniques to match a player to a group of players with one or more similarities. Once a matching group is identified, information accumulated for that group of players may be used to improve one or more aspects of game play for the particular player. Additionally, or alternatively, information collected from the particular player may be used to make adjustments to the information accumulated for the matching group of players (e.g., preferences, game playing styles or tendencies, etc.).

In some embodiments, a contactless input interface for gaming systems may include a virtual sphere having one or more game components (e.g., symbols, numbers, buttons, pop-up lists, etc.) on the surface of the sphere. A player may cause the virtual sphere to move translationally and/or rotationally by turning one or more of his hands as if the virtual sphere were in his hands. For instance, in some embodiments, a contactless sensor (e.g., an imaging device) may be placed under the player's hands to sense movements thereof. The gaming system may be configured to interpret the movement of either or both of the player's hands and cause the virtual sphere to move accordingly. For example, the gaming system may interpret the hand movement by taking into account any suitable combination of one or more aspects of the hand movement, such as a distance and/or direction by which a hand is displaced, an angle by which a hand is twisted, etc.

In some embodiments, a virtual sphere may be rendered using a 3D display technique so that it is projected out of a display screen. A player may place his hands where the virtual sphere appears visually, as if he were physically manipulating the sphere. Alternatively, or additionally, the virtual sphere may be displayed elsewhere (e.g., on a 2D screen), and a visual indicator (e.g., cursor) may be used to indicate where an index finger of the player would have been located relative to time virtual sphere if the virtual sphere were in the player's hands.

In some embodiments, a player may interact with a game component on a surface of a virtual sphere by turning his hands, which may cause the virtual sphere to rotate, until the desired game component is under the player's index finger. In an embodiment in which the virtual sphere is rendered in 3D and appears visually under the player's hands, the player may cause the game component to visually appear under his index finger. In an embodiment in which the virtual sphere is displayed elsewhere, the player may cause the game component to appear under a visual indicator (e.g., cursor) corresponding to the player's index finger. The player may then use a gesture (e.g., a downward click) to indicate that he wishes to select the game component or otherwise trigger an action corresponding to the game component.

In some embodiments, where a 3D display is provided, one or more adjustments may be made based on a player's physical position in relation to the display screen, and/or based on the player's viewpoint orientation. For example, in some embodiments, a wagering gaming apparatus may utilize one or more sensor devices to sense the physical location of an anatomical feature of the player, such as the player's head, and/or one or both of the player's eyes. In some embodiments, one or more processors of the wagering gaming apparatus may utilize the sensed data in composing the 3D scene for presentation to the player, so that the 3D scene appears and behaves realistically as the player's viewpoint perspective changes, and/or as the player interacts physically with virtual 3D objects displayed as being projected from the screen. For example, in some embodiments, the 3D scene may be generated as a view from a virtual 3D camera into a virtual 3D model including virtual game components. In some embodiments, the virtual camera's location, viewpoint orientation and/or field of view with respect to the virtual 3D model may be specified and/or adjusted based on the sensed location and/or orientation of the player's anatomical feature(s) such as the player's head and/or eye(s). In this manner, in some embodiments, the player may be able to view different portions of or perspectives on the 3D scene by changing his/her physical viewpoint with respect to the display screen. Also, in some embodiments, object detection processing may include transformation calculations to more accurately detect intended interactions between detected objects and virtual game components based on the viewpoint of the player.

While a number of inventive techniques are described herein for controlling a gaming system, it should be appreciated that embodiments of the present disclosure may include any one of these techniques, any combination of two or more techniques, or all of the techniques, as aspects of the present disclosure are not limited to any particular number or combination of the techniques described herein. The aspects of the present disclosure described herein can be implemented in any of numerous ways, and are not limited to any particular details of implementation. Described below are examples of specific implementations; however, it should be appreciated that these examples are provided merely for purposes of illustration, and that other implementations are possible.

In some embodiments, one or more techniques described herein may be used in a system for controlling an electronic gaming machine (EGM) in a casino (e.g., a slot machine). The techniques described herein may also be used with other types of devices, including but not limited to PCs, laptops, tablets, smartphones, etc. Although not required, some of these devices may have one or more communication capabilities (e.g., Ethernet, wireless, mobile broadband, etc.), which may allow the devices to access a gaming site or a portal (which may provide access to a plurality of gaming sites) via the Internet.

FIG. 1A is a perspective view of an illustrative EGM 10 where a gesture input interface may be provided, in accordance with some embodiments. In the example of FIG. 1A, the EGM 10 includes a display 12 that may be a thin film transistor (TFT) display, a liquid crystal display (LCD), a cathode ray tube (CRT) and LED display, an OLED display, or a display of any other suitable type. The EGM 10 may further include a second display 14, which may be used in addition to the display 12 to show game data or other information. In some embodiments, the display 14 may be used to display an advertisement for a game, one or more rules of the game, pay tables, pay lines, and/or any other suitable information, which may be static or dynamically updated. In some embodiments, the display 14 may be used together with the display 12 to display all or part of a main game or a bonus game.

In some embodiments, one or both of the displays 12 and 14 may have a touch screen lamination that includes a transparent grid of conductors. A human fingertip touching the screen may change the capacitance between the conductors at the location of the touch, so that the coordinates of that location may be determined. The coordinates may then be processed to deter mine a corresponding function to be performed. Such touch screens are known in the art as capacitive touch screens. Other types of touch screens, such as resistive touch screens, may also be used.

In the example of FIG. 1A, the EGM 10 has a coin slot 22 for accepting coins or tokens in one or more denominations to generate credits for playing games. The EGM may also include a slot 24 for receiving a ticket tier cashless gaming. The received ticket may be read using any suitable technology, such as optical, magnetic, and/or capacitive reading technologies. In some embodiments, the slot 24 may also be used to output a ticket, which may carry preprinted information and/or information printed on-the-fly by a printer within the EGM 10. The printed information may be of any suitable form, such as text, graphics, barcodes, QR codes, etc.

In the example of FIG. 1A, the EGM 10 has a coin tray 32 for receiving coins or tokens from a hopper upon a win or upon the player cashing out. However, in some embodiments, the EGM 10 may be a gaming terminal that does not pay in cash but only issues a printed ticket for cashing in elsewhere. In some embodiments, a stored value card may be loaded with credits based on a win, or may enable the assignment of credits to an account (e.g., via a communication network).

In the example of FIG. 1A, the EGM 10 has a card reader slot 34 for receiving a card that carries machine-readable information, such as a smart card, magnetic strip card, or a card of any other suitable type. In some embodiments, a card reader may read the received card for player and credit information for cashless gaming. For example, the card reader may read a magnetic code from a player tracking card, where the code uniquely identifies a player to the EGM 10 and/or a host system to which the EGM 10 is connected. In some embodiments, the code may be used by the EGM 10 and/or the host system to retrieve data related to the identified player. Such data may affect the games offered to the player by the EGM 10. In some embodiments, a received card may carry credentials that may enable the EGM 10 and/or the host system to access one or more accounts associated with a player. The account may be debited based on wagers made by the player and credited based on a win. In some embodiments, a received card may be a stored value card, which may be debited based on wagers made by the player and credited based on a win. The stored value card may not be linked to any player account, but a player may be able to assign credits on the stored value card to an account (e.g., via a communication network).

In the example of FIG. 1A, the EGM 10 has a keypad 36 for receiving player input, such as a user name, credit card number, personal identification number (PIN), or any other player information. In some embodiments, a display 38 may be provided above the keypad 36 and may display a menu of available options, instructions, and/or any other suitable information to a player. Alternatively, or additionally, the display 38 may provide visual feedback of which keys on the keypad 36 are pressed.

In the example of FIG. 1A, the EGM 10 has a plurality of player control buttons 39, which may include any suitable buttons or other controllers for playing any one or more games offered by EGM 10. Examples of such buttons include, but are not limited to, a bet button, a repeat bet button, a spin reels (or play) button, a maximum bet button, a cash-out button, a display pay lines button, a display payout tables button, select icon buttons, and/or any other suitable buttons. In some embodiments, any one or more of the buttons 39 may be replaced by virtual buttons that are displayed and can be activated via a touch screen.

Figure 1B:
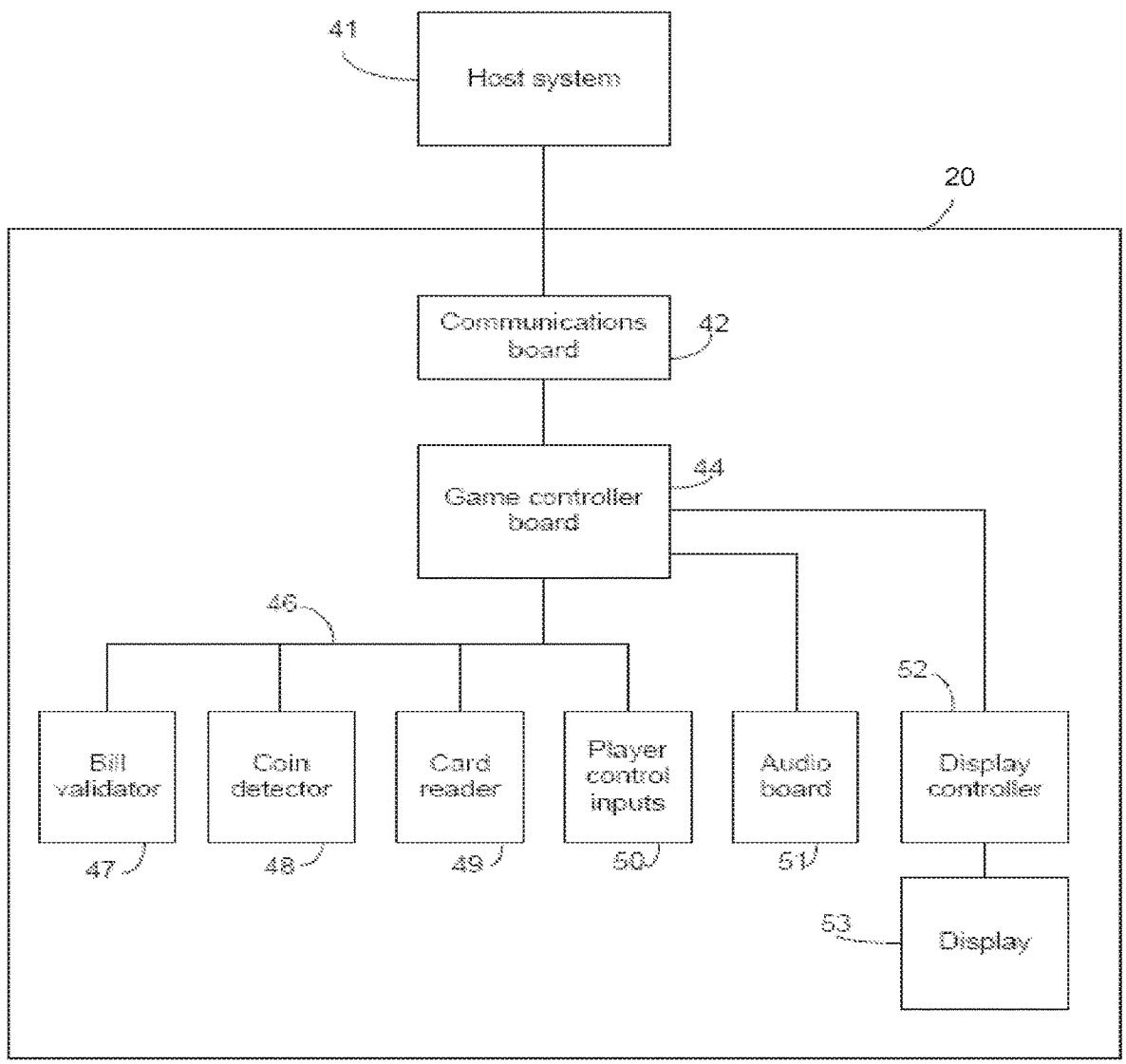
FIG. 1B is a block diagram of an illustrative EGM linked to a host system, in accordance with some embodiments.

FIG. 1B is a block diagram of an illustrative EGM 20 linked to a host system 41, in accordance with some embodiments. In this example, the EGM 20 includes a communications board 42, which may contain circuitry for coupling the EGM 20 to a local area network (LAN) and/or other types of networks using any suitable protocol, such as a G2S (Game to System) protocol. The G2S protocols, developed by the Gaming Standards Association, are based on standard technologies such as Ethernet, TCP/IP and XML and are incorporated herein by reference.

In some embodiments, the communications board 42 may communicate with the host system 41 via a wireless connection. Alternatively, or additionally, the communications board 42 may have a wired connection to the host system 41 (e.g., via a wired network running throughout a casino floor).

In some embodiments, the communications board 42 may set up a communication link with a master controller and may buffer data between the master controller and a game controller board 44 of the EGM 20. The communications board 42 may also communicate with a server (e.g., in accordance with a G2S standard), for example, to exchange information in carrying out embodiments described herein.

In some embodiments, the game controller board 44 may contain one or more non-transitory computer-readable media (e.g., memory) and one or more processors for carrying out programs stored in the non-transitory computer-readable media. For example, the processors may be programed to transmit information in response to a request received from a remote system (e.g., the host system 41). In some embodiments, the game controller board 44 may execute not only programs stored locally, but also instructions received from a remote system (e.g., the host system 41) to carry out one or more game routines.

In some embodiments, the EGM 20 may include one or more peripheral devices and/or boards, which may communicate with the game controller board 44 via a bus 46 using, for example, an RS-232 interface. Examples of such peripherals include, but are not limited to, a bill validator 47, a coin detector 48, a card reader 49, and/or player control inputs 50 (e.g., the illustrative buttons 39 shown in FIG. 1A and/or a touch screen). However, it should be appreciated that aspects of the present disclosure are not limited to the use of any particular one or combination of these peripherals, as other peripherals, or no peripheral at all, may be used.

In some embodiments, the game controller board 44 may control one or more devices for producing game output (e.g., sound, lighting, video, haptics, etc.). For example, the game controller board 44 may control an audio board 51 for converting coded signals into analog signals for driving one or more speakers (not shown). The speakers may be arranged in any suitable fashion, for example, to create a surround sound effect for a player seated at the EGM 20. As another example, the game controller board 44 may control a display controller 52 for converting coded signals into pixel signals for one or more displays 53 (e.g., the illustrative display 12 and/or the illustrative display 14 shown in FIG. 1A).

In some embodiments, the display controller 52 and the audio board 51 may be connected to parallel ports on the game controller board 44. However, that is not required, as the electronic components in the EGM 20 may be arranged in any suitable way, such as onto a single board.

Although some illustrative EGM components and arrangements thereof are described above in connection with FIGS. 1A-B, it should be appreciated that such details of implementation are provided solely for purposes of illustration. Other ways of implementing an EGM are also possible, using any suitable combinations of input, output, processing, and/or communication techniques.

In some embodiments, an EGM may be configured to provide 3D enhancements, for example, using a 3D display. For example, the EGM may be equipped with an autostereoscopic display, which may allow a player to view images in 3D without wearing special glasses. Other types of 3D displays, such as stereoscopic displays and/or holographic displays, may be used in addition to, or instead of autostereoscopic displays, as aspects of the present disclosure are not limited to the use of autostereoscopic displays. In some embodiments, an eye-tracking technology and/or head-tracking technology may be used to detect the player's position in front of the display, for example, by analyzing in real time one or more images of the player captured using a camera in the EGM. Using the position information detected in real time by an eye tracker, two images, one for the left eye and one for the right eye, may be merged into a single image for display. A suitable optical overlay (e.g., with one or more lenticular lenses) may be used to extract from the single displayed image one image for the left eye and a different image for the right eye, thereby delivering a 3D visual experience.

Figure 1C:
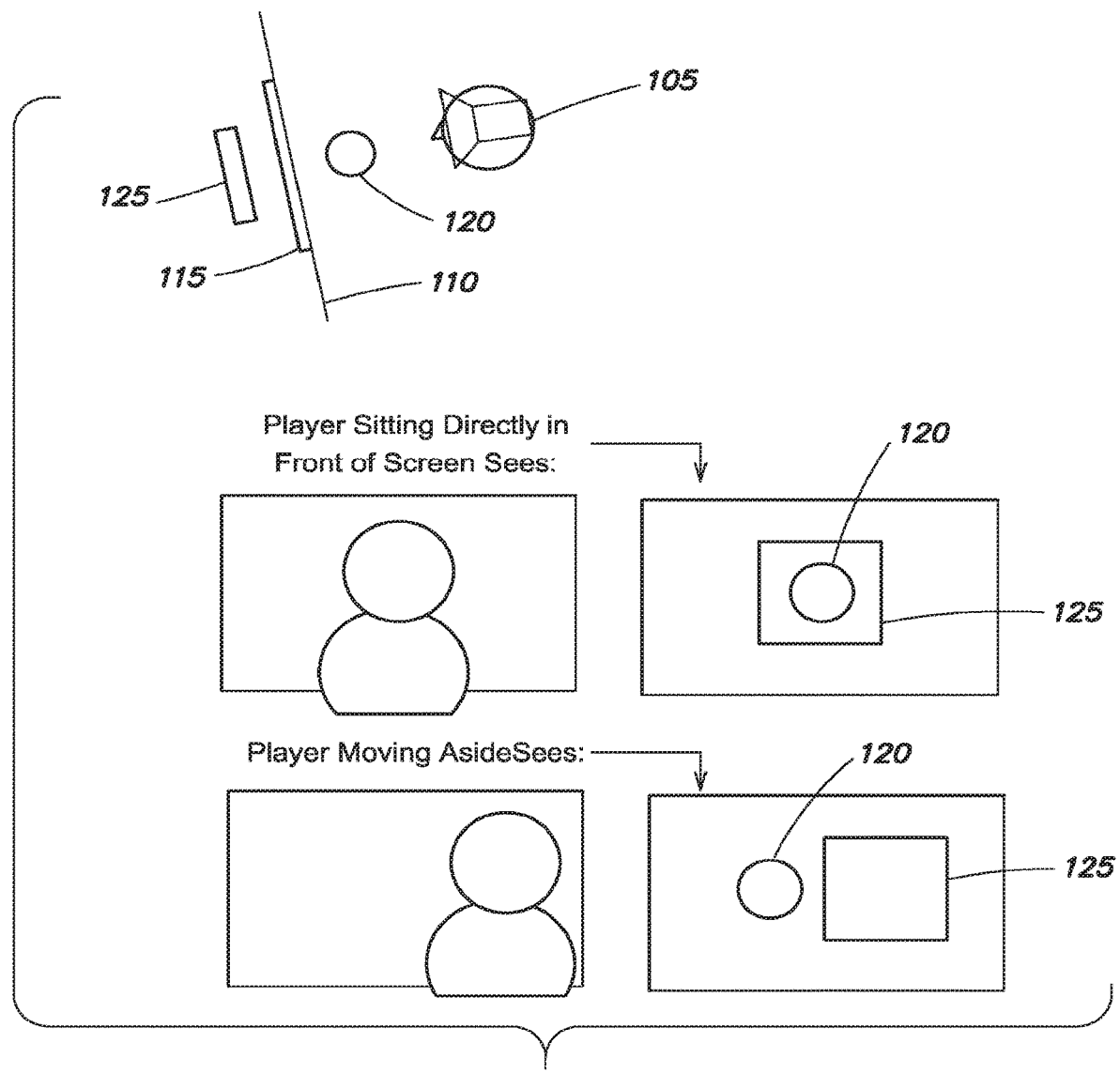
FIG. 1C illustrates some examples of visual illusions created using an autostereoscopic display, in accordance with some embodiments.

FIG. 1C illustrates some examples of visual illusions created using an autostereoscopic display, in accordance with some embodiments. In this example, a player 105 may be seated in front of an autostereoscopic display 110. Using autostereoscopic techniques such as those discussed above, one image may be shown to the player's left eye and a different image may be shown to the player's right eye. These different images may be processed by the player's brain to give the perception of 3D depth. For example, the player may perceive a spherical object 120 in front of the display 110 and a square object 125 behind the display 110. Furthermore, although not shown, a perception that the spherical object 120 is moving towards the player and/or a perception that the square object is moving away from the player may be created by dynamically updating the combined image shown on the display 110.

In some embodiments, if the player moves to one side of the screen (e.g., to the right), this movement may be detected (e.g., using an eye tracker) and the display may be dynamically updated so that the player will see the spherical object 120 offset from the square object 125 (e.g., to the left of the square object 125), as if the objects were truly at some distance from each other along a z-axis (i.e., an axis orthogonal to the plane in which the display 110 lies).

Although an autostereoscopic display may facilitate more natural game play, it should be appreciated that aspects of the present disclosure are not limited to the use of an autostereoscopic display, or any 3D display at all, as some of the disclosed concepts may be implemented using a conventional 2D display. Furthermore, aspects the present disclosure are not limited to the autostereoscopic techniques discussed above, as other autostereoscopic techniques may also be suitable. Also, any suitable type of 3D display technology may be used, including but not limited to volumetric 3D display technologies such as light field, projected light, integrated imaging, phased array optical, or any other suitable type of volumetric 3D display technology.

Figure 18A:
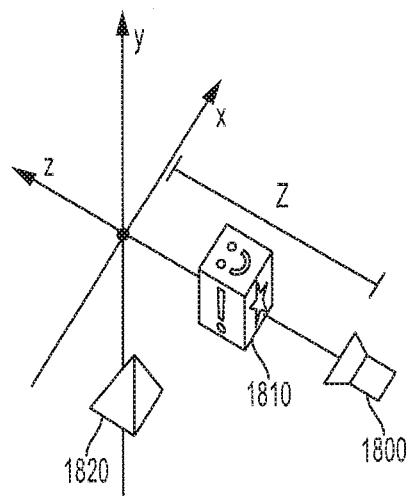
FIG. 18A is a perspective view of an exemplary virtual 3D model that may be created by a gaining system, in accordance with some embodiments.

In some embodiments utilizing a 3D display (e.g., an autostereoscopic display, or other type of 3D display), the 3D scene presented to the player via the 3D display device of a wagering gaming apparatus may be generated from a virtual 3D model constructed as data in memory by one or more processors of the wagering gaming apparatus. FIG. 18A graphically illustrates an example of such a virtual 3D model, in which virtual game components such as cube 1810 and pyramid 1820 are located at particular positions within a virtual 3D space. The virtual 3D space is represented using a three-dimensional coordinate system, which in this example includes orthogonal x-, y-, and z-axes that intersect at an origin position in the virtual 3D model. While exemplary x-, y-, and z-axes are utilized herein for purposes of illustration, it should be appreciated that any suitable three-dimensional coordinate system may be used (e.g., Cartesian, spherical, cylindrical, or any other type of three-dimensional coordinate system), as embodiments are not limited in this respect. The virtual game components such as cube 1810 and 1820 may be of any suitable type, form and number, and may be located in any suitable positions in the virtual 3D model as determined by a given game design.

Figure 18B:
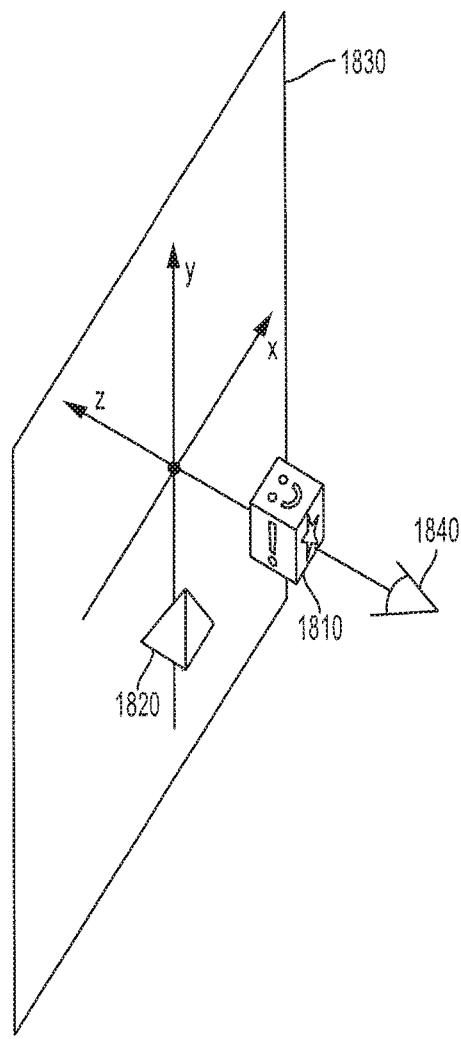
FIG. 18B is a perspective view of an exemplary physical 3D display of a 3D scene that may be created by a gaming system, in accordance with some embodiments.

In some embodiments, one or more processors of the wagering gaming apparatus may be programmed to generate a 3D scene as a view from a virtual 3D camera 1800 into the virtual 3D model, creating a visual illusion for the player of viewing the virtual game components in 3D as if the player were standing/sitting at the virtual camera location within the virtual 3D model. This may be done using any suitable 3D graphical data processing technique(s), examples of which are known. FIG. 18B illustrates art exemplary visual illusion of a 3D scene that may be created for a player via a 3D display device, corresponding to the computed view from virtual 3D camera 1800 of the virtual 3D model in FIG. 18A. In the example of FIG. 18B, the visual illusion of the 3D scene is created around a 2D physical screen 1830 whose width dimension corresponds to the x-axis of the virtual 3D model and whose height dimension corresponds to the y-axis of the virtual 3D model. The 3D scene displayed to the player has perceived depth in a direction perpendicular to the screen 1830, corresponding to the z-axis of the virtual 3D model. In the example of FIG. 18B, virtual game components 1810 and 1820 are perceived by the player, via operation of the 3D display device, to be "floating" in front of the screen 1830, at some distance from the screen 1830 in the z-direction.

In some embodiments, it may be desirable to control the positions at which virtual game components appear to the player in the 3D scene in relation to the physical screen 1830. Thus, in some embodiments, the origin position in the virtual 3D model may be mapped to a corresponding origin position on the screen 1830. In some embodiments, the origin position on the screen 1830 may be the center of the screen (e.g., x=y=0); however, this is not required. Any suitable location on the screen 1830 may be designated as the origin position in other embodiments. In some embodiments, the location of virtual 3D camera 1800 within the virtual 3D model may be specified based on the player's positioning in relation to screen 1830, such that the perceived positions of virtual game components 1810 and 1820 to the player with respect to the screen origin will bear a known relation to the positions of the virtual game components 1810 and 1820 in the virtual 3D model with respect to the model origin.

Thus, in some embodiments, a wagering gaining apparatus may utilize one or more sensor devices to sense the physical location of an anatomical feature 1840 of the player, so that the virtual camera location can be specified and/or adjusted accordingly. Any suitable anatomical feature may be selected for detection, although in some embodiments the anatomical feature may be selected to be indicative of the player's viewpoint. In some embodiments, the detected anatomical feature may be the player's head or a more specific feature located on the player's head; in some embodiments, the detected anatomical feature may be either or both of the player's eyes. Hereafter, the detected physical location of this anatomical feature, which may be selected to be any suitable anatomical feature of the player, will be referred to as the player's "viewpoint." Any suitable sensor device(s) may be used to sense the player's viewpoint, examples of which include one or more cameras or eye-tracking devices. These may be the same or different devices as those used to determine the positioning of the player's eyes for projection of autostereoscopic 3D images in some embodiments.

In some embodiments, one or more processors of the wagering gaming apparatus may be programmed to process the detected physical location of the player's viewpoint 1840 to detect a distance D between the player's viewpoint 1840 and the origin position on the screen 1830. In some embodiments, the processor(s) may further be programmed, in generating the 3D scene, to locate virtual 3D camera 1800 at a virtual camera location whose distance Z from the origin position in the virtual 3D model is specified based on the distance D. For example, in some embodiments, the distance Z of the virtual camera location from the model origin may be set equal to the distance D from the player's viewpoint 1840 to the screen origin. In this manner, in some embodiments, the generated 3D scene may cause the player to perceive the virtual game components 1810 and 1820 to be the same physical distance from the screen origin as they are from the origin position in the virtual 3D model.

In some embodiments, not only the virtual camera's distance from the model origin may be matched to the player's viewpoint's distance from the screen origin, but also all three-dimensional coordinates of the virtual camera location may be matched to the three-dimensional coordinates of the physical location of the player's viewpoint with respect to the screen origin. For example, in some embodiments, the model origin may be mapped to the physical screen origin, and the x-, y-, and z-coordinates of the virtual camera location may be matched to the x-, y-, and z-coordinates of the physical location of the player's viewpoint. Thus, for example, if the player's viewpoint 1840 were offset horizontally from the screen origin by a distance X, as illustrated in FIG. 19A, in some embodiments the virtual camera location may be correspondingly offset from the model origin, such that the 3D scene generated and displayed to the player represents a view of the virtual game components in the virtual 3D model from the perspective of the player's viewpoint location. FIG. 19B illustrates how cube 1810 may appear to be viewed from an angle by matching the x-coordinate of the virtual camera location to the horizontal offset X of the player's viewpoint 1840 in FIG. 19A. Likewise, if the player's viewpoint 1840 were offset by a vertical distance Y in addition to a horizontal distance X, matching the x- and y-coordinates of the virtual camera location might produce a view of cube 1810 from above and to the left, as illustrated in FIG. 19C.

Figure 20A:
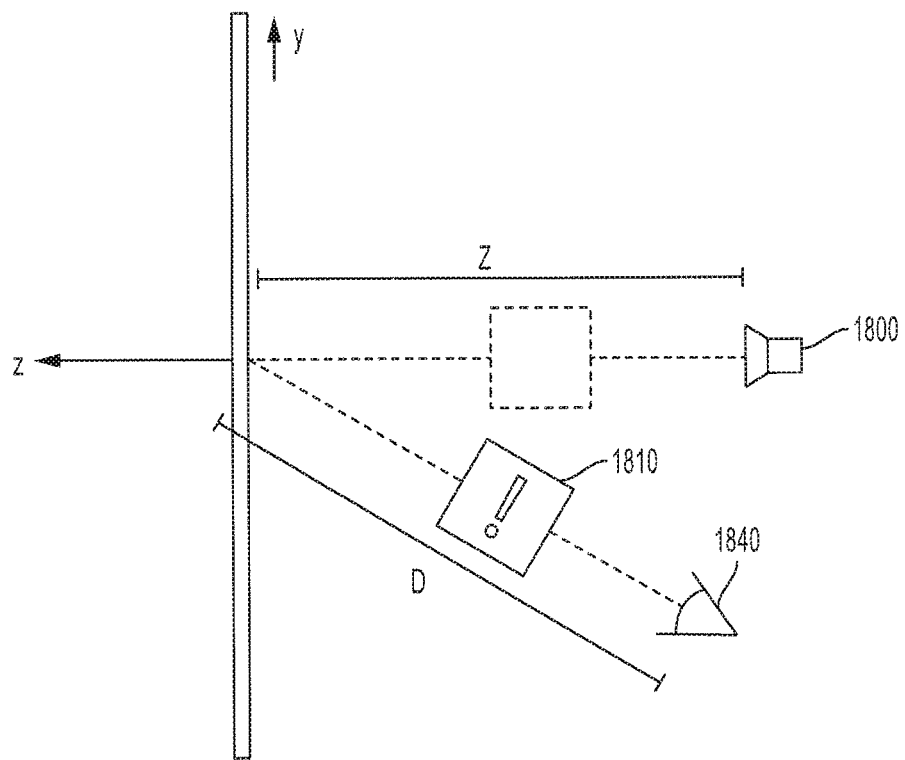
FIG. 20A is a side view of an exemplary physical 3D display of a 3D scene that may be created by a gaming system, in accordance with some embodiments.
Figure 20B:
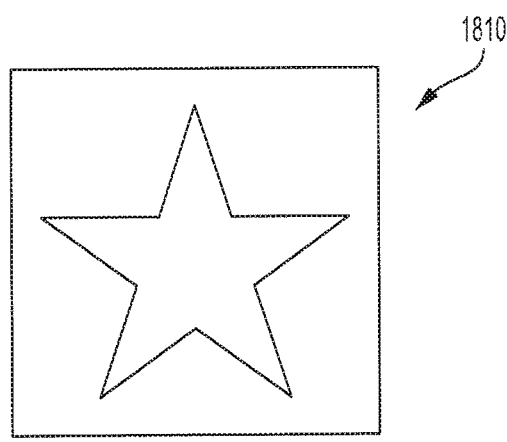
FIG. 20B illustrates an exemplary 3D view of a virtual game component that may be created by a gaming system, in accordance with some embodiments.

In some embodiments, however, not all three-dimensional coordinates of the virtual camera location may be matched to the three-dimensional coordinates of the player's viewpoint. For example, FIG. 20A illustrates an embodiment in which the vertical coordinate of virtual 3D camera 1800 is set at y==0, despite the player's viewpoint 1840 being negatively offset in the y-direction (i.e., vertically lower than the screen origin). In this example, maintaining the virtual camera location at y=0 (on the z-axis), as it was in FIG. 18A, causes the player to perceive the cube 1810 as being viewed head-on, as illustrated in FIG. 20B, rather than being viewed from below. Additionally, matching the virtual camera's distance Z from the model origin to the player's viewpoint's distance L) from the screen origin causes the player to perceive the cube 1810 as being projected the same distance in front of the screen 1830 as was perceived in FIG. 18B. In this manner, in some embodiments 3D scenes may be generated that allow players of different heights to achieve the same perception of the virtual game components and enjoy the same gaming experience.

Figure 21A:
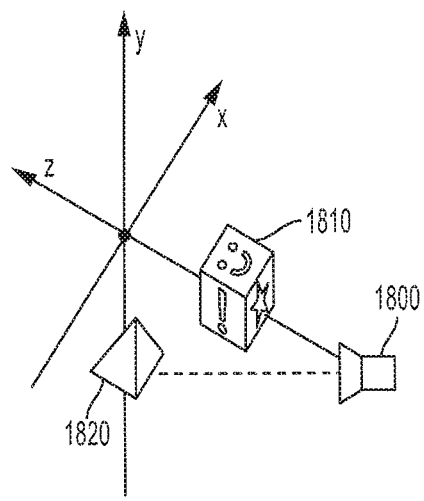
FIG. 21A is a perspective view of an exemplary virtual 3D model that may be created by a gaming system, in accordance with some embodiments.
Figure 21B:
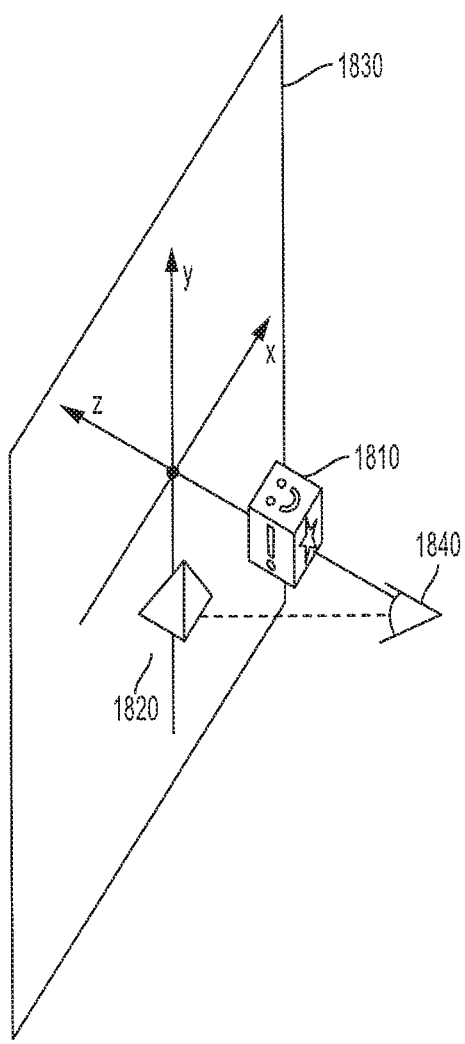
FIG. 21B is a perspective view of an exemplary physical 3D display of a 3D scene that may be created by a gaming system, in accordance with some embodiments.

In some embodiments, one or more sensor devices may alternatively or additionally be configured to sense an orientation of the player's viewpoint (e.g., the direction in which the player is looking), as a viewpoint orientation of the player's detected anatomical feature discussed above. In some embodiments, the viewpoint orientation of the virtual 3D camera 1800 may be set and/or updated based on the orientation of the player's viewpoint. FIGS. 21A and 21B illustrate an example in which the player's viewpoint 1840 in FIG. 21B is oriented toward virtual game component 1820, rather than toward virtual game component 1810 and the screen origin. In this example, the viewpoint orientation of the virtual 3D camera 1800 is likewise directed toward virtual game component 1820 in the virtual 3D model in FIG. 21A, rather than toward the model origin. This setting of the virtual 3D camera's viewpoint orientation may result in the 3D scene being generated as a view centered on virtual game component 1820, creating for the player the illusion of looking straight at that component.

Figure 22A:
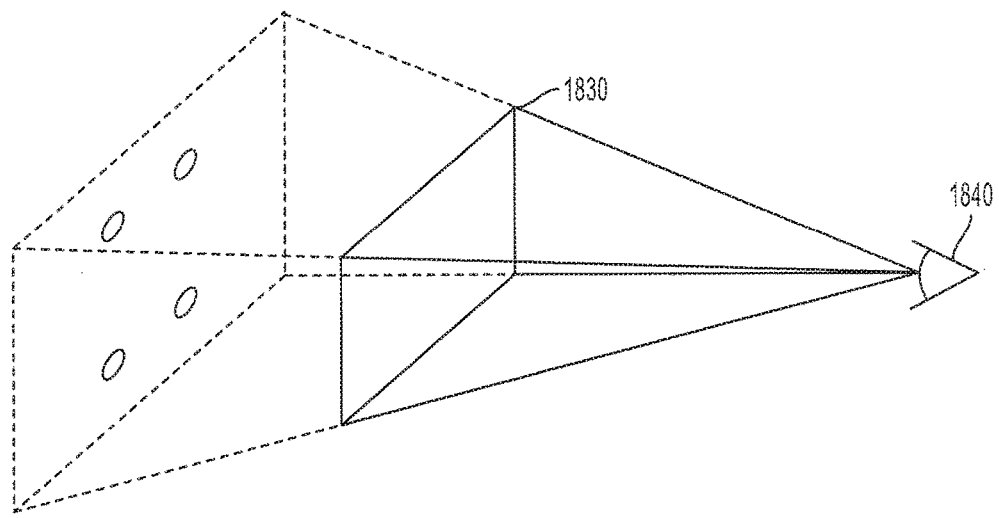
FIGS. 22A and 22B illustrate 3D field-of-view adjustments that may be implemented by a gaming system, in accordance with some embodiments.
Figure 22B:
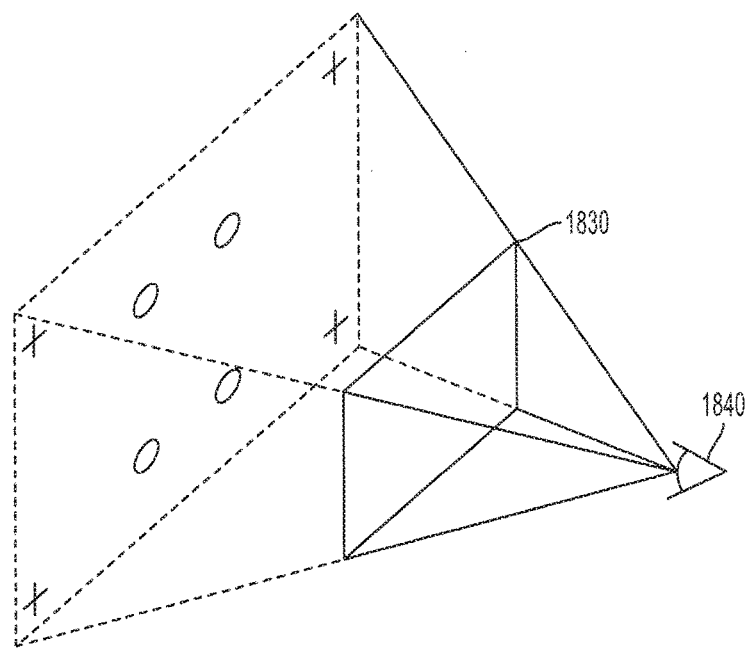

In some embodiments, a field-of-view setting for the virtual 3D camera may be set based on the distance of the player's viewpoint from the screen origin. This may create the illusion, in some embodiments, of the physical screen 1830 being a window into a 3D scene including virtual game components that are projected behind the screen 1830. When the player's viewpoint 1840 is closer to the screen 1830, more of the 3D scene projected behind the screen 1830 may be visible than when the player's viewpoint 1840 is farther away from the screen 1830. An example is illustrated in FIGS. 22A and 22B. When the player's viewpoint 1840 is farther away from the screen 1830, as in FIG. 22A, the virtual 3D camera's field of view is set smaller, such that the player's field of view "through" the screen 1830 is smaller and encompasses the four circular virtual game components shown. When the player's viewpoint 1840 is closer to the screen 1830, as in FIG. 22B, the virtual 3D camera's field of view is set larger, such that the player's field of view "through" the screen 1830 is larger and encompasses the surrounding X's in addition to the circular virtual game components. This may be accomplished in any suitable way. In some embodiments, the virtual 3D camera's field of view may be computed by taking a frustum of a pyramid whose sides begin at the player's viewpoint and pass through the edges of the screen 1830.

In some embodiments, the 3D scene generated and displayed to the player may be updated in accordance with changes in the player's viewpoint. For example, in some embodiments, the virtual camera's location, viewpoint orientation, and/or field-of-view setting may be changed in accordance with a corresponding change in the player's viewpoint. In some embodiments, the player's viewpoint may be tracked continuously, and the 3D scene may be updated in essentially real time to respond to movement in the player's viewpoint. Generating the 3D scene in some embodiments may involve any one, some, or all of the foregoing considerations (e.g., virtual camera location, viewpoint orientation, and/or field-of-view), in any suitable combination. Likewise, any one, some, or all of these settings and/or computations may be changed in any suitable combination to update a 3D scene in response to a change in the player's viewpoint.

Thus, in some embodiments, when a change is detected in the distance between the player's viewpoint and the screen origin, the 3D scene may be updated at least in part by changing the field-of-view setting for the virtual 3D camera. Alternatively or additionally, in some embodiments when a change is detected in the player's viewpoint orientation, the 3D scene may be updated at least in part by changing the viewpoint orientation of the virtual 3D camera correspondingly. For example, in some embodiments the 3D scene may originally be generated as a view from the virtual 3D camera with its viewpoint orientation toward the model origin, and the 3D scene may be updated at least in part by changing the virtual 3D camera's viewpoint orientation away from the model origin in accordance with a detected change in the player's viewpoint orientation.

Alternatively or additionally, in some embodiments when a change is detected in the player's viewpoint location, the 3D scene may be updated at least in part by changing the virtual camera location in the virtual 3D model. In some embodiments, the virtual 3D camera's distance from the model origin may be updated in accordance with a change in the player's viewpoint's distance from the screen origin. In some embodiments, this may include changing three-dimensional coordinates of the virtual camera location in accordance with respective three-dimensional components of the change in the player's viewpoint location, as illustrated in FIGS. 19A-C. In other embodiments, the detected change in the player's viewpoint location may be separated into various components, and one or more coordinates of the virtual camera location may be changed in accordance with one or more components of the player's viewpoint change, while one or more other coordinates of the virtual camera location may be fixed despite corresponding components of change in the player's viewpoint. For example, in some embodiments, a vertical coordinate (e.g., y-coordinate) of the virtual camera location may be fixed, regardless of any vertical change in the player's viewpoint, while other components of change in the player's viewpoint (e.g., horizontal movement, and/or change in distance from the screen) may trigger corresponding changes in the virtual camera location. In this manner, for example, in some embodiments, a player's experience of the 3D scene may not be changed by the player sitting, standing up, slouching, etc., but the player may be able to look around at the sides of virtual game components (e.g., to discover hidden game content, etc.) and look closer (e.g., "zoom in") on them as desired.

Figure 2A:
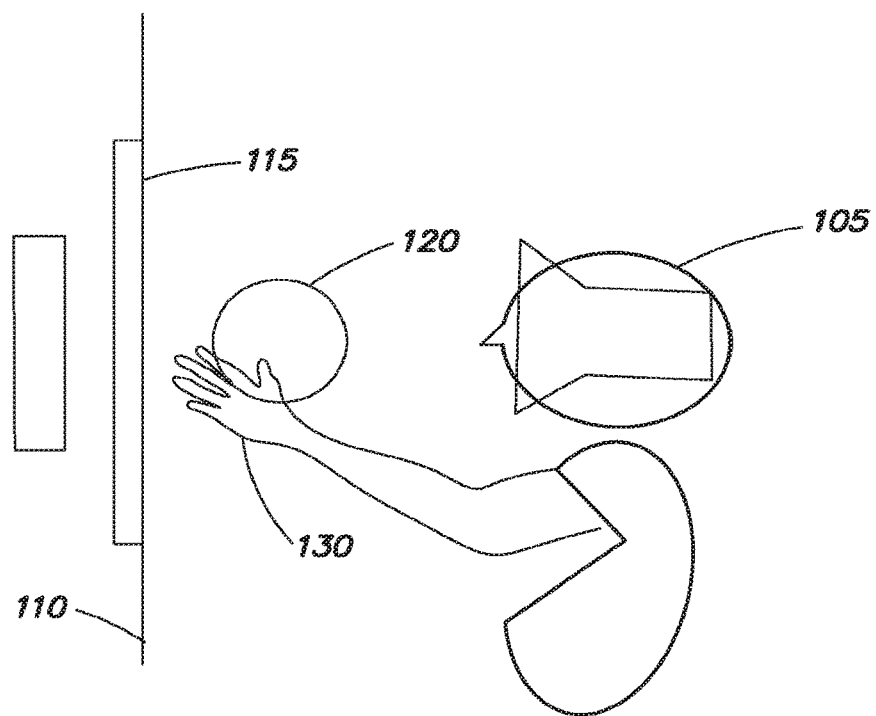
FIG. 2A shows an illustrative 3D gaming system with a touch screen that allows a player to interact with a game, in accordance with some embodiments.

FIG. 2A shows an illustrative 3D gaming system with a touch screen that allows a player to interact with a game, in accordance with some embodiments. In this example, the display 110 functions as both a 3D display and a touch screen. For example, as shown in FIG. 2A, the player 105 may interact with the spherical object 120 by touching the display 110 with his hand 130 at a location 135 where the spherical object 120 is displayed. However, because the spherical object 120 is displayed in 3D, the location 135 on the display 110 may be offset along the z-axis from where the spherical object appears to the player 105 visually. As a result, the player 105 may perceive that to select the spherical object 120 he is to put his hand. 130 through the spherical Object 120. The gaming system may provide no response until the player's hand 130 reaches the display 110, which may feel unnatural to the player 105 because the display 110 appears to him to be at some distance behind the spherical object 120.

The inventors have recognized and appreciated that a more natural experience may be delivered using an input interface that allows a player to virtually touch a game component at the same location where the game component appears visually to the player, thereby reducing the above-described sensory mismatch.

Figure 2B:
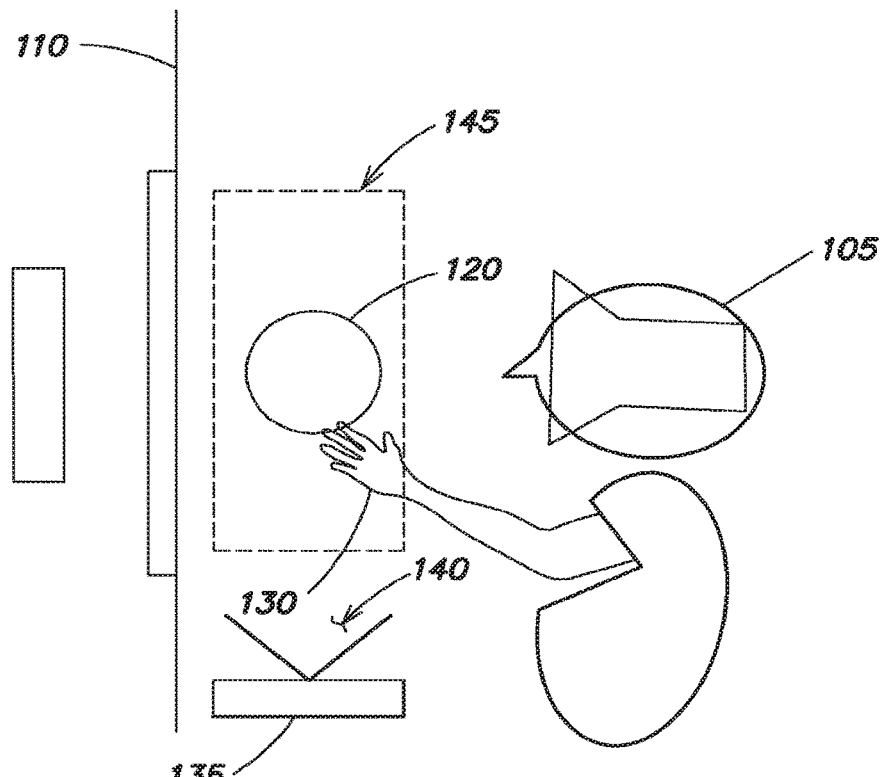
FIG. 2B shows an illustrative 3D gaming system with a gesture input interface, in accordance with some embodiments.

FIG. 2B shows an illustrative 3D gaming system with a gesture input interface, in accordance with some embodiments. The gesture input interface may be contactless, and may be used in lieu of, or in combination with, a contact-based interface such as a keyboard, a mouse, a touch screen, etc.

In the example of FIG. 2B, the gaming system includes one or more contactless sensor devices, such as sensor device 135. The sensor devices may use any suitable combination of one or more sensing techniques, including, but not limited to, optical, thermal, radio, and/or acoustic techniques. In some embodiments, a sensor device may include one or more emitters for emitting waves such as sound waves and/or electromagnetic waves (e.g., visible light, infrared radiation, radio waves, etc.) and one or more detectors (e.g., cameras) for detecting waves that bounce back from an object. In some embodiments, a sensor device may have no emitter and may detect signals emanating from an object (e.g., heat, sound, etc.). One or more processors in the sensor device and/or some other component of the gaming system may analyze the received signals to determine one or more aspects of the detected object, such as size, shape, orientation, etc. and, if the object is moving, speed, direction, acceleration, etc.

The sensor devices may be arranged in any suitable manner to detect gestures made by a player. For example, as shown in FIG. 2B, the sensor device 135 may be placed between the display 110 and the player 105, so that a 3D field of view 140 of the sensor device 135 at least partially overlap with a 3D display region 145 into which objects such as the virtual sphere 120 are visually projected. In this manner, the sensor device 135 may "see" the player's hand 130 when the player reaches into the display region 145 to virtually touch the spherical object 120.

In some embodiments, the region 145 may be in close proximity (i.e., within 3 feet) of a gaming apparatus. For instance, the region 145 may be in close proximity to the screen 110 in the example of FIG. 2B. In this manner, the player's hand 130 may also be in close proximity to the screen 110 when the player reaches into the display region 145 to virtually touch the spherical object 120. Thus, in some embodiments, the player may be located (e.g., standing or sitting) at such a distance from the gaming apparatus that he is able to reach into the display region 145 with his hand by extending his arm. In some embodiments, the player may be located at such a distance from the gaming apparatus that he is also able to touch the screen 110 physically (e.g., where the screen 110 functions as both a 3D display and a touch screen).

In various embodiments, the region 145 and the player's hand may be within 33 inches, 30 inches, 27 inches, 24 inches, 21 inches, 18 inches, 15 inches, 12 inches, 11 inches, 10 inches, 9 inches, 8 inches, 7 inches, 6 inches, 5 inches, 4 inches, 3 inches, 2 inches, 1 inch, 0.75 inches, 0.5 inches, 0.25 inches, etc. of a gaming apparatus (e.g., the screen 110 in the example of FIG. 2B). However, it should be appreciated that aspects of the present disclosure are not limited to a display region or player's hand being in close proximity to a gaming apparatus. In some embodiments, the display region or player's hand may be further (e.g., 5 feet, 10 feet, etc.) away from a gaming apparatus.

In the example of FIG. 2B, the sensor device 135 is placed under the display region 145 and the field of view 140 may be an inverted pyramid. However, that is not required, as the sensor device 135 may be placed elsewhere (e.g., above or to either side of the display region 145) and the field of view 140 may be of another suitable shape (e.g., pyramid, cone, inverted cone, cylinder, etc.). Also, multiple sensor devices may be used, for example, to achieve an expanded field of view and/or to increase recognition accuracy.

Figure 3:
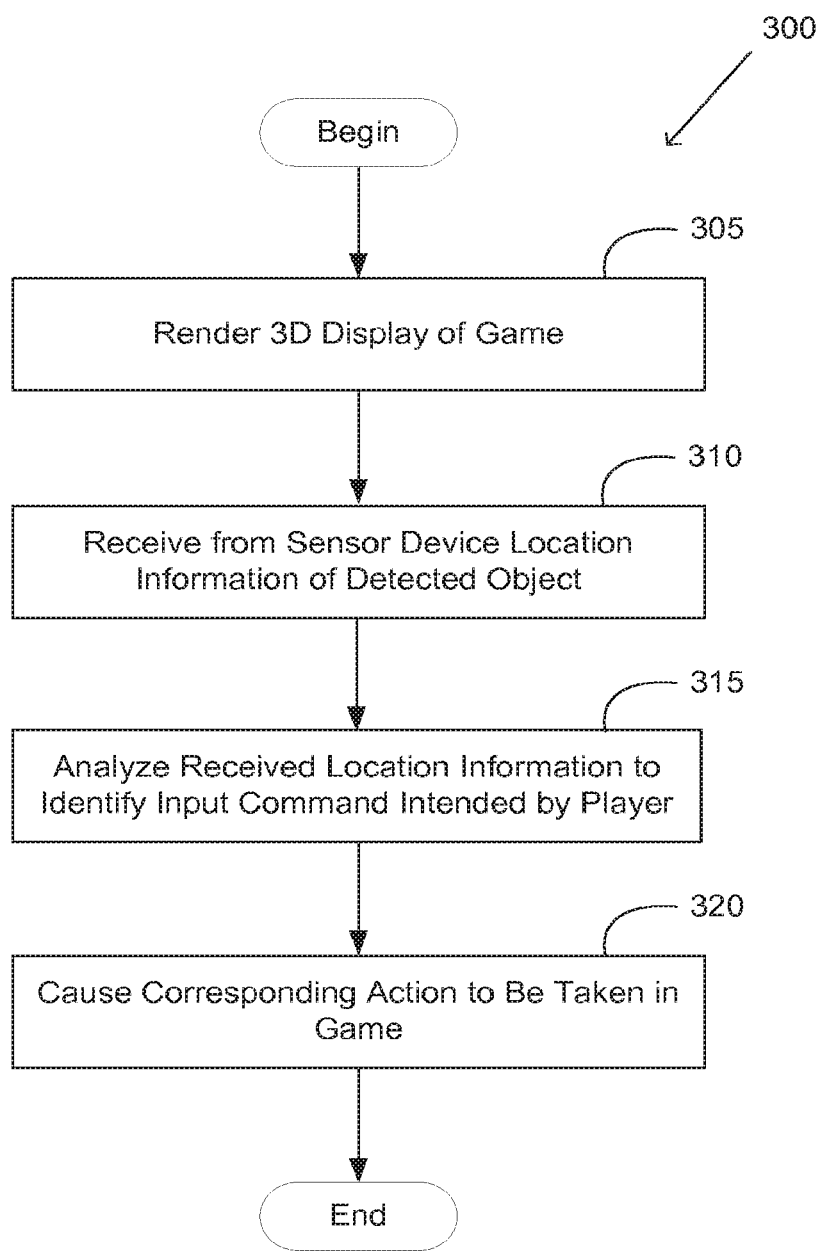
FIG. 3 shows an illustrative process that may be performed by a gaming system with a gesture input interface, in accordance with some embodiments.

FIG. 3 shows an illustrative process 300 that may be performed by a gaining system with a gesture input interface, in accordance with some embodiments. For example, the gaming system may perform the process 300 to control a wagering gaming apparatus (e.g., the illustrative EGM 10 shown in FIG. 1A) to provide a gesture input interface.

At act 305, the gaming system may render a 3D display of a game, for example, using an autostereoscopic display. In some embodiments, the display may visually project one or more game components (e.g., buttons, tiles, cards, symbols, figures, etc.) out of a screen and into a 3D space between the screen and a player (e.g., as illustrated in FIGS. 2A-B).

At act 310, the gaming system may receive information from one or more sensor devices (e.g., the illustrative sensor device 135 shown in FIG. 2B). In some embodiments, the received information may indicate a location of a detected object, such as an anatomical feature of a player (e.g., hand, finger, etc.) or a tool held by the player (e.g., pen, wand, baton, gavel, etc.). The location may be expressed in any suitable coordinate system (e.g., Cartesian, polar, spherical, cylindrical, etc.) with any suitable units of measurement (e.g., inches, centimeters, millimeters, etc.). In one non-limiting example, a Cartesian coordinate system may be used with the origin centered at the sensor device. The x-axis may run horizontally to the right of the player, the y-axis may run vertically upwards, and the z-axis may run horizontally towards the player. However, it should be appreciated that other coordinate systems may also be used, such as a coordinate system centered at a display region into which game components are visually projected.

In some embodiments, a detected object may be divided into multiple regions and a different set of coordinates may be provided for each region. For example, where the detected object is a human hand, a different set of coordinates may be provided for each fingertip, each joint in the hand, the center of the palm, etc. In some embodiments, multiple objects may be detected, and the received information may indicate multiple corresponding locations.

Location information is merely one example of information that may be received from a sensor device. Additionally, or alternatively, a sensor device may provide gesture information, which may include static gesture information such as a direction in which a fingertip or palm is pointing, a location of a particular join in the hand, whether the fingers are curled into the palm to form a first, etc. In some embodiments, a sensor device may also have processing capabilities for identifying dynamic gestures, which may include finger gestures such as forward tap, downward click, swipe, circle, pinch, etc., and/or hand gestures such as side-to-side wave, downward pat, outward flick, twist, etc. Such processing capabilities may be provided by one or more processors onboard the sensor device and/or a driver installed on a general-purpose computing device configured to receive signals from the sensor device for further processing.

In some embodiments, a sensor device may provide motion information in addition to, or in lieu of, position and/or gesture information. As discussed further below, motion information may allow the gaining system to detect dynamic gestures that neither the sensor device nor its driver has been configured to detect.

Returning to FIG. 3, the gaming system may, at act 315, analyze the information received at act 310 to identify an input command intended by the player. In some embodiments, the received information may indicate a location of a detected object (e.g., a hand or finger of the player or a tool held by the player), and the gaming system may determine whether the location of the detected Object matches an expected location to which the display is configured to visually project a game component (e.g., a button, a tile, a card, a symbol, a figure, etc.).

In some embodiments, the display of a game may be refreshed dynamically, so that the expected location of a game component may change over time, and/or the game component may disappear and may or may not later reappear. Accordingly, the gaming system may be configured to use state information of the game to determine whether the location of the detected object matches the expected location of the game component with appropriate timing.

If at act 315 it is determined that the location of the detected object matches the expected location of a game component, the gaming system may determine that the player intends to issue an input command associated with the game component. At act 320, the gaining system may cause an action to be taken in the game, the action corresponding to the identified input command.

In one non-limiting example, the game component may be a button (or lever) in a slot machine game, and the information received from the sensor device may indicate that the player made a forward tap gesture at a location to which the button is visually projected (or a downward pull gesture at a location to which the lever is visually projected). The gaming system may be configured to interpret such a gesture as an input command to spin the reels of the slot machine game. In another example, the game component may be a card in the player's hand, and the information received from the sensor device may indicate that the player made a forward tap gesture at the visual location of the card. The gaming system may be configured to interpret such a gesture as an input command to discard the card. In another example, the game component may be a card on the top of a deck, and the gaming system may be configured to interpret a forward tap gesture at the visual location of the card as an input command to draw the card. In yet another example, the game component may be a card in the player's hand, and the information received from the sensor device may indicate that the player made a swipe gesture at the visual location of the card. The gaming system may be configured to interpret such a gesture as an input command to move the card to another position in the player's hand.

It should be appreciated that the above-described gestures and corresponding input commands are merely illustrative, as other types of game components and virtual manipulations thereof may also be used and the gaming system may be configured to interpret such manipulations in any suitable way.

In some embodiments, the gaming system may be configured to update the 3D display of the game based on the action taken in the act 320. Updating the display may include changing an appearance of an object in an existing scene (e.g., spinning a wheel, turning over a card, etc.). Updating the display may also include generating a new scene, for example, by generating a new 3D mesh.

In some embodiments, the gaining system may be configured to use motion information received from the sensor device to identify an input command intended by the player. For instance, the gaming system may be configured to analyze a sequence of image frames and determine a starting location, ending location, duration, distance, direction, speed, acceleration, and/or any other relevant characteristics of a movement of an anatomical feature of the player (e.g., the player's hand, finger, etc.) or a tool held by the player. In one non-limiting example, a player may spin a wheel virtually in a wheel of fortune game, and the gaming system may be configured to analyze a distance, direction, speed, acceleration, duration, etc. of the motion of the player's hand to determine how fast and in which direction the wheel should be spun. The player may also touch the wheel virtually while the wheel is spinning, and the gaming system may be configured to analyze a location, duration, etc. of the touch to determine how quickly the wheel should slow to a stop.

It should be appreciated that the wheel of fortune example described above is merely illustrative, as aspects of the present disclosure are not limited to the use of motion analysis in determining an outcome of a game. In some embodiments, a player's motion may merely trigger an action in a game (e.g., to throw a pair of dice, to shoot a roulette ball, to spin a wheel, etc.). The outcome of the action may be randomized according to a certain probability distribution (e.g., a uniform or non-uniform distribution over the possible outcomes).

In some embodiments, the gaming system may be configured to use one or more thresholds to determine whether a detected motion is to be interpreted as a gesture command. Such thresholds may be selected to distinguish unintentional movements from movements that are actually intended by a player as gesture commands. For instance, a combination of one or more thresholds may be selected so that a sufficiently high percentage of movements intended as a particular gesture command will be recognized as such, while a sufficiently low percentage of unintentional movements will be misrecognized as that gesture command. In one non-limiting example, a downward movement of a finger may be interpreted as a downward click only if the distance moved exceeds a selected distance threshold and the duration of the movement does not exceed a selected duration threshold. Thus, a quick and pronounced movement may be recognized as a click, while a slow or slight movement may simply be ignored.

In some embodiments, the gaining system may be configured to dynamically adapt one or more thresholds for determining whether a detected movement is to be interpreted as a gesture command. In one non-limiting example, the gaming system may be configured to collect and analyze information relating to how a particular player moves his hands and/or fingers when issuing a particular gesture command, and may adjust one or more thresholds for that gesture command accordingly. In another example, the gaming system may be configured to collect and analyze information relating to how differently a particular player moves his hands and/or fingers when issuing two confusable gesture commands, and may adjust one or more thresholds for distinguishing movements intended as the first command from those intended as the second command.

In some embodiments, one or more thresholds specifically adapted for a player and/or other player-specific information may be stored in a manner that allows retrieval upon detecting an identity of the player. For example, each player may be associated with an identifier (e.g., a user name, alphanumeric code, etc.), which the player may use to sign on to a gaming system. The gaming system may use the identifier to look up player-specific information (e.g., threshold values, preferences, history, etc.) and apply all or some of the retrieved information in a game. The application of such information may be automatic, or the player may be prompted to confirm before anything takes effect.

Any suitable method may be used to detect an identity of a player. In some embodiments, prior to starting a game, a player may be prompted to produce a card carrying an identifying code, which may be read using a suitable sensing technology (e.g., magnetic, optical, capacitive, etc.). The card may be issued to the player for gaming purposes only (e.g., by a casino or gaming website), or for more general purposes. For example, the card may be a personal debit or credit card. If the player is visiting a gaming establishment (e.g., a casino), he may be promoted to insert, swipe, or other provide the card to a special-purpose reader located at a gaming station such as a gaming cabinet, table, etc. If the player is playing a game remotely (e.g., by accessing a gaming website from his home computer) and does not have access to a special-purpose reader, a general-purpose device may be used to obtain identifying information from the card. For example, an image of the card may be captured using a camera (e.g., a webcam or cellphone camera) and one or more optical recognition techniques may be applied to extract the identifying information.

Rather than producing a card to be read physically by a reader, a player may provide identifying information in some other suitable fashion. For example, the player may type in a user name, identifying code, etc. In another example, the player may speak a user name, identifying code, etc., which may be transcribed using speech recognition software. In yet another example, a combination of one or more biometric recognition techniques may be used, including, but not limited to, voice, fingerprint, face, hand, iris, etc.

Figure 4A:
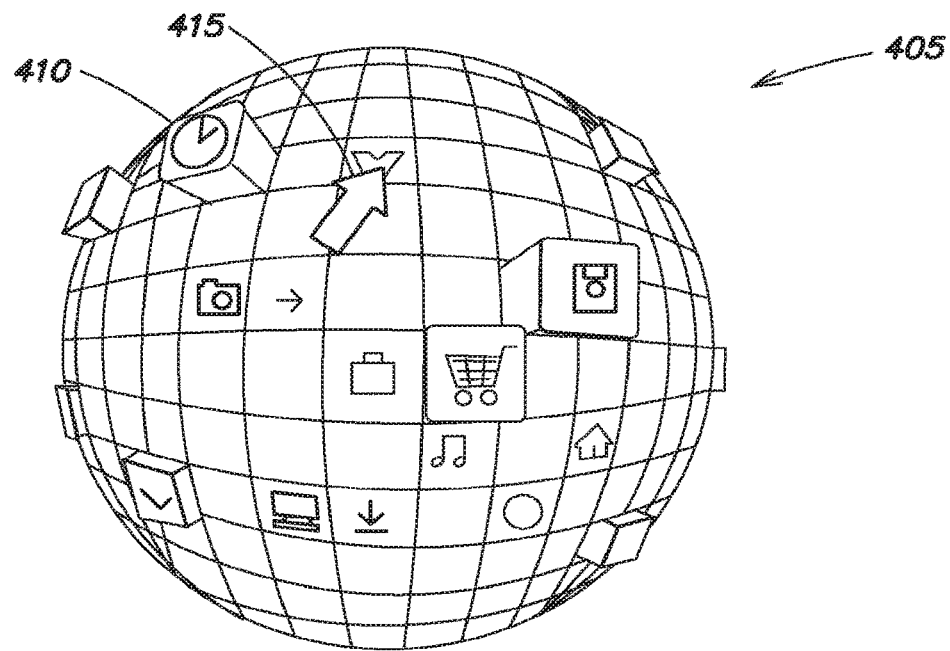
FIG. 4A shows an illustrative virtual sphere that may be used in a gesture input interface, in accordance with some embodiments.

In some embodiments, a gesture input interface for gaming systems may include a virtual sphere having one or more game components (e.g., symbols, numbers, cards, tiles, buttons, pop-up lists, etc.) arranged on the surface of the sphere. FIG. 4A shows an illustrative virtual sphere 405 that may be used in a gesture input interface, in accordance with some embodiments. In this example, a plurality of buttons, such as a button 410, are arranged in a grid on the surface of the virtual sphere 405. Some buttons (e.g., the button 410) may be raised above the surface of the sphere 405 to various heights, while other buttons may be flush with or below the surface. The height of a button may indicate its status (e.g., a raised button may be one that is available for activation). However, buttons of varying heights are not required, as the buttons may be arranged in any suitable way on the surface of the sphere 405, with or without status indication. Also, although in the example of FIG. 4A the surface of the sphere 405 is covered by the grid of buttons, in other implementations fewer buttons may be arranged on a sphere and the surface thereof may not be entirely covered.

Figure 4B:
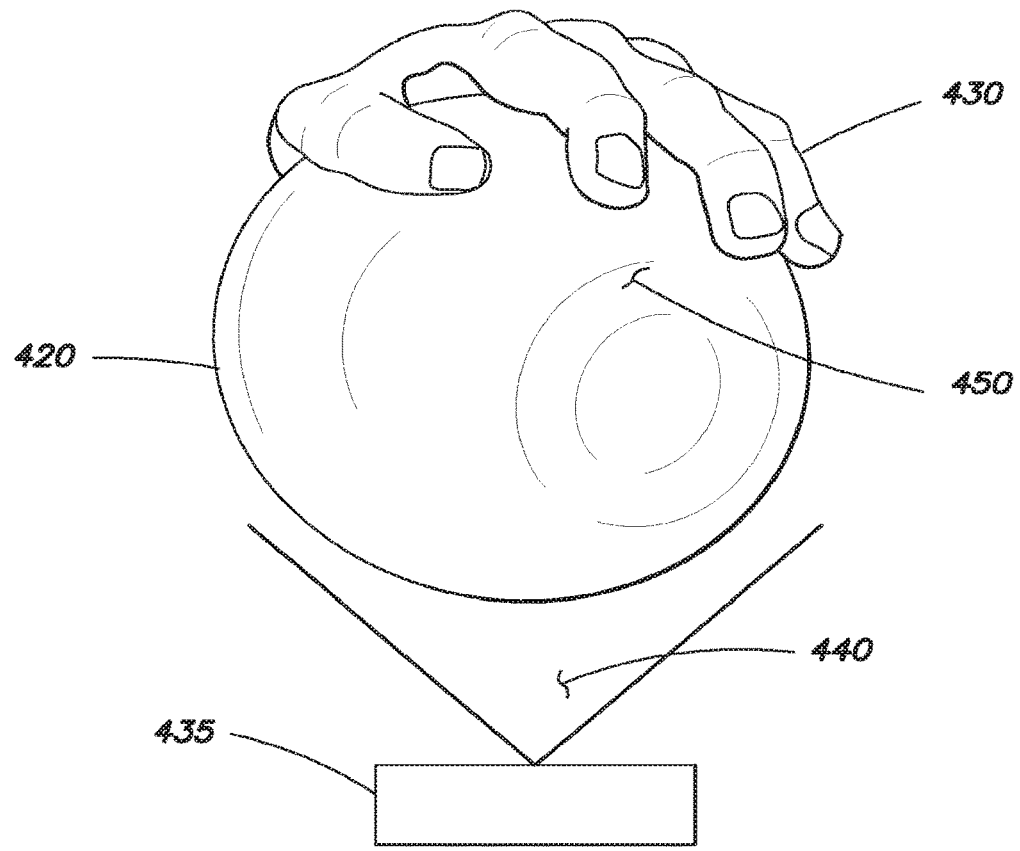
FIG. 4B shows an illustrative gaming system with a contactless sensor device placed under a player's hand to sense movements thereof, in accordance with some embodiments.

In some embodiments, a player may cause the virtual sphere 405 to move translationally and/or rotationally by turning one or more of his hands as if the virtual sphere 405 were in his hands. For instance, as shown in FIG. 4B, a contactless sensor device 435 (e.g., an imaging device) may be placed under a player's hand 430 to sense movements thereof, in accordance with some embodiments. In that respect, the sensor device 435 may be placed at a location where the player can hold out his hand 430 over the sensor device 435, so that the hand 430 is in a 3D field of view 440 of the sensor device 435 and the sensor device 435 can "see" the movements of the hand 430.

In the example shown in FIG. 4B, the gaming system may be configured to map a movement of the hand 430 to a corresponding movement of an imaginary sphere 420 held in the hand 430. The gaming system may be configured to interpret such a movement of the hand 430 as an input command to cause the virtual sphere 405 to move accordingly. In some embodiments, the gaming system may be configured to analyze hand movement by analyzing any suitable combination of one or more aspects of the movement, such as a distance and/or direction by which the hand 430 is displaced, an angle by which the hand 430 is twisted, etc.

In some embodiments, the gaming system may be configured to render the virtual sphere 405 using a 3D display, for instance, as described above in connection with FIG. 2B. FIG. 5 shows an illustrative example in which the virtual sphere 405 is visually projected out of a display screen into a 3D space between the display screen (not shown) and the player, in accordance with some embodiments. In this example, the 3D field of view 440 of the sensor device 435 overlaps with a 3D region in which the virtual sphere 405 is displayed, so that the player may place his hands where the virtual sphere 405 appears visually, as if the player were physically manipulating the virtual sphere 405. Thus, with reference back to FIG. 4B, the visual location of the virtual sphere 405 may coincide with the location of the imaginary sphere 420 in the hand 430. Alternatively, or additionally, the virtual sphere 405 may be displayed on a screen (e.g., 2D or 3D screen) outside the field of view 440 of the sensor device 435.

In some embodiments, the 3D region into which the virtual sphere 405 is projected may be in close proximity (i.e., within 3 feet) of a gaming apparatus. For instance, the 3D region may be in close proximity to the display screen displaying the virtual sphere 405. In this manner, the player's hand may also be in close proximity to the display screen when the player reaches into the 3D region to virtually manipulate the virtual sphere 405. In various embodiments, the 3D region and the player's hand may be within 33 inches, 30 inches, 27 inches, 24 inches, 21 inches, 18 inches, 15 inches, 12 inches, 11 inches, 10 inches, 9 inches, 8 inches, 7 inches, 6 inches, 5 inches, 4 inches, 3 inches, 2 inches, 1 inch, 0.75 inches, 0.5 inches, 0.25 inches, etc. of a gaming apparatus (e.g., the display screen in the example of FIG. 5). However, it should be appreciated that aspects of the present disclosure are not limited to a display region or player's hand being in close proximity to a gaming apparatus. In some embodiments, the display region or player's hand may be further (e.g., 5 feet, 10 feet, etc.) away from a gaming apparatus.

In some embodiments, a player may interact with a game component on a surface of a virtual sphere by turning his hands, which as discussed above may cause the virtual sphere to rotate, until the desired game component is under the player's index finger. The player may then use a gesture (e.g., a downward click) to indicate he wishes to select the game component or otherwise trigger an action corresponding to the game component.

In an embodiment in which the virtual sphere is rendered in 3D and appears visually under the player's hands (e.g., as in the example of FIG. 5), the player may cause the game component to visually appear under his index finger. In an embodiment in which the virtual sphere is displayed elsewhere, the player may cause the game component to appear under a visual indicator corresponding to the player's index finger. For instance, in the example shown in FIG. 4A, an illustrative cursor 415 is used to indicate where an index finger of the player would have been located relative to the virtual sphere 405 if the virtual sphere 405 were in the player's hand. Thus, the location of the cursor 415 on the virtual sphere 405 in FIG. 4A may correspond to the location on the imaginary sphere 420 indicated by an arrow 450 in FIG. 4B.

In some embodiments, two visual indicators (e.g., cursors) may be displayed, corresponding to a player's left and right index fingers, respectively. In some embodiments, only one visual indicator may be displayed, and a player may configure the gaming system to display the visual indicator on the left or right side of the virtual sphere (e.g., depending on the player's handedness). For example, if the player wishes to click with his left index figure, the player may configure the gaming system to display the visual indicator on the left side of the virtual sphere, and vice versa. Additionally, or alternatively, the gaming system may be configured to detect which hand the player favors and change the visual indicator from left to right, or vice versa.

It should be appreciated that the examples described above in connection with FIGS. 4A-B and 5 are merely illustrative, as aspect of the present disclosure are not limited to the use of a virtual sphere in a gesture input interface. For example, one or more other shapes such as a cube, a star, a diamond, a cylinder, etc. may be used in addition to, or instead of, a sphere.

Figure 6:
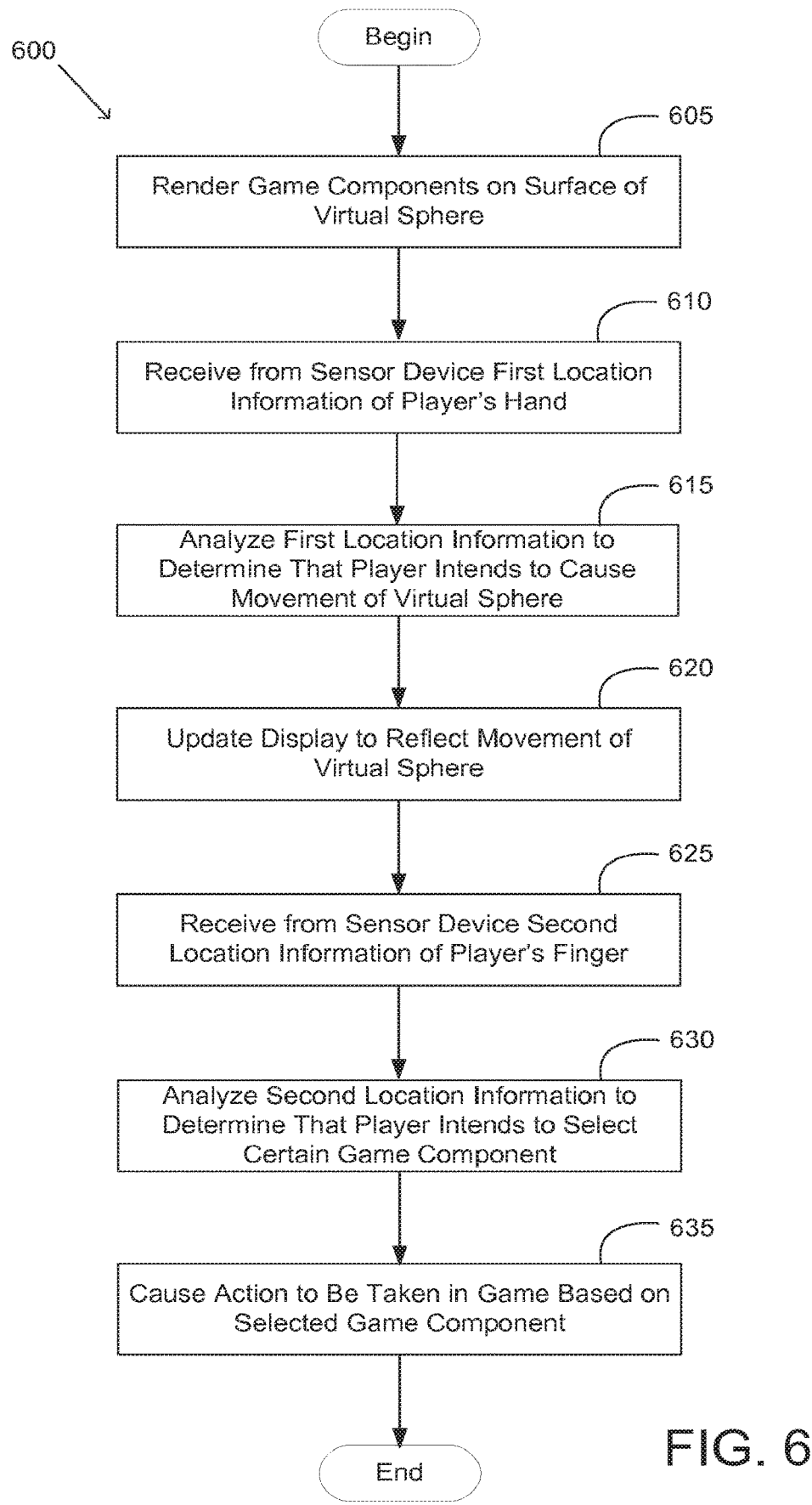
FIG. 6 shows an illustrative process that may be performed by a gaming system to provide a gesture input interface using a virtual sphere, in accordance with some embodiments.

FIG. 6 shows an illustrative process 600 that may be performed by a gaining system to provide a gesture input interface using a virtual sphere, in accordance with some embodiments. For example, the gaming system may perform the process 600 to control a wagering gaming apparatus (e.g., the illustrative EGM 10 shown in FIG. 1A) to provide a gesture input interface similar to those described above in connection with FIGS. 4A-B and 5.

At act 605, the gaming system may render a display of a game. In some embodiments, the display may include a plurality of game components (e.g., the illustrative button 410 of FIG. 4A) located on a surface of a virtual sphere (e.g., the illustrative virtual sphere 405 of FIG. 4A).

At act 610, the gaming system may receive from one or more contactless sensor devices (e.g., the illustrative sensor device 435 of FIG. 4B) hand location information indicative of where a player's hand (e.g., the illustrative hand 430 of FIG. 4B) is located.

At act 615, the gaming system may analyze the hand location information received at act 610, and may determine based on that analysis that the player intends to issue an input command to cause a certain movement of the virtual sphere. For instance, in some embodiments, the gaming system may be configured to determine a direction in which the player's palm is pointing, and to use a detected change in the palm direction to infer an angle by which the player intends to rotate the virtual sphere. Likewise, the gaming system may be configured to determine a location of the player's palm, and to use a detected change in the palm location to infer an intended translational displacement of the virtual sphere.

In some embodiments, the gaming system may determine a movement of the virtual sphere that matches the hand movement, as if the virtual sphere were held in the hand. In some embodiments, the gaming system may determine a different type of movement for the virtual sphere. For example, the gaming system may interpret the hand movement as an input command to cause the virtual sphere to spin about an axis. Thus, the angle by which the virtual sphere is spun may be greater than the angle by which the player turned his hand, to mimic the effect of inertia. For example, the virtual sphere may continue to spin for some time after the player used his hand to start the spinning and may slow down gradually as if being slowed down by friction.

At act 620, the gaming system may update the display of the game to reflect the intended movement of the virtual sphere as determined at act 615. This may take place within a sufficiently small time delay following the player's hand motion to deliver a realistic experience. An acceptable response time may be several seconds (e.g., 1 sec, 2 sec, 3 sec, . . . ) or fractions of a second (e.g., 0.5 sec, 0.3 sec, 0.2 sec, 0.1 sec, 0.05 sec, . . . ).

At act 625, the gaming system may receive from the sensor device (and/or a different sensor device) finger location information indicative of where a player's finger (e.g., index finger) is located.

At act 630, the gaming system may analyze the finger location information received at act 625, and may determine based on that analysis that the player intends to issue an input command to select one of the game components arranged on the surface of the virtual sphere. In some embodiments, the finger location information may include a sequence of locations of the finger, and the gaming system may be configured to determine that the sequence of locations correspond to a certain gesture (e.g., downward click). The gaining system may be further configured to determine that the player intends to select the game component having a location on the virtual sphere that matches the location where the finger gesture is detected. For example, in an embodiment in which the virtual sphere is virtually projected into a 3D space under the player's hand (e.g., as shown in FIG. 5), the gaming system may be configured to determine that the location at which the finger gesture is detected matches an expected location to which a game component is to be visually projected, and may therefore identify that game component as the one selected by the player.

In some embodiments, one or more thresholds may be used to determine whether the player made a certain finger gesture such as downward click. In one non-limiting example, the gaming system may be configured to determine, based on measurements taken by the sensor device, a distance by which the player moved his finger. The gaming system may be configured to recognize the gesture only if the distance exceeds a certain threshold (e.g., 25 mm, 20 mm, 15 mm, 10 mm, 5 mm, . . . ).

At act 635, the gaming system may cause an action to be taken in the game. In some embodiments, the gaming system may be configured to determine the action to be taken based at least in part on the selected game component as determined at act 630. In some embodiments, the action to be taken may be determined based at least in part on one or more characteristics of the movement. For example, the gaming system may be configured to distinguish between a single click and a double click, and may take different actions accordingly.

As discussed throughout this disclosure, a gesture input interface may be used in conjunction with any suitable system, including, but not limited to, a system for playing wagering games. Some non-limiting examples of such games are described below. Other non-limiting examples can be found in U.S. patent application Ser. No. 14/029,364, entitled "Enhancements to Game Components in Gaining Systems," filed on Sep. 17, 2013, claiming priority to U.S. Provisional Application No. 61/746,707 of the same title, filed on Dec. 28, 2012. Further examples can be found in U.S. patent application Ser. No. 13/361,129, entitled "Gaming System and Method Incorporating Winning Enhancements," filed on Sep. 28, 2012, and PCT Application No. PCT/CA2013/050053, entitled "Multi-Player Electronic Gaming System," filed on Jan. 28, 2013. All of these applications are incorporated herein by reference in their entireties.

Figure 8:
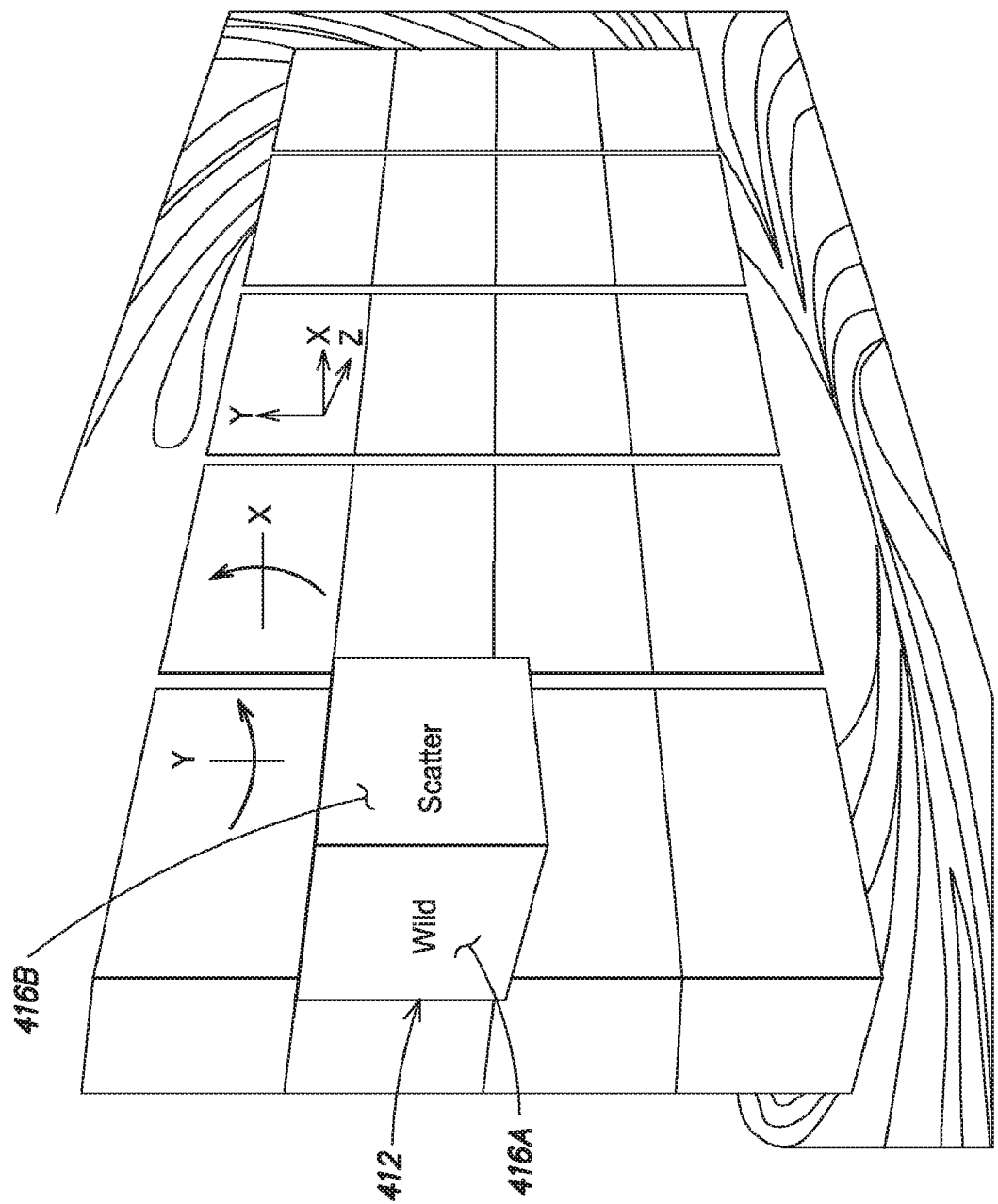
FIG. 8 shows an illustrative example of a pattern game in which a gesture input interface may be used to enhance a player's experience, in accordance with some embodiments.

FIG. 8 shows an illustrative example of a pattern game in which a gesture input interface may be used to enhance a player's experience, in accordance with some embodiments. In this example, the game display includes an array of cells, where each cell may display one of several different symbols. The symbols displayed in each cell may move, for example, as if they were on a spinning reel. The player may win if a winning pattern is displayed, e.g., with matching symbols aligned vertically, horizontally, diagonally, etc.

In some embodiments, the display may include at least one multifaceted game component that is displayed in 3D. In the example of FIG. 8, a game component 412 has one or more faces, such as faces 416A and 418B. Additional symbols (e.g. wild and/or scatter symbols) may be provided on these faces. In some embodiments, a gesture input interface such as one of those described in connection with FIG. 2B may be used to allow a player to use his hand to spin a multifaceted game component along any suitable axis (e.g., the and/or y-axes as shown in FIG. 8). In an example in which multiple multifaceted game components are used, such game components may be spun by the player at different speeds and/or different directions.

Figure 9:
FIG. 9 shows another illustrative example of a pattern game in which a gesture input interface may be used to enhance a player's experience, in accordance with some embodiments.

FIG. 9 shows another illustrative example of a pattern game in which a gesture input interface may be used to enhance a player's experience, in accordance with some embodiments. In this example, a display shows a grid of 20 game components arranged in five columns and four rows. In some embodiments, one or more of the game components may be visually projected out of the display screen and into a 3D space between the screen and a player. In the example of FIG. 9, a game component 902 in the form of a sphinx figure is so projected, and the player may be prompted to use his hand to virtually touch the game component 902 to trigger a bonus game. A gesture input interface such as one of those described in connection with FIG. 2B may be used to detect the player's hand movement (e.g., virtually touching the sphinx figure's face) and in response cause the bonus game to start.

Figure 10:
FIG. 10 shows yet another illustrative example of a pattern game in which a gesture input interface may be used to enhance a player's experience, in accordance with some embodiments.

FIG. 10 shows yet another illustrative example of a pattern game in which a gesture input interface may be used to enhance a player's experience, in accordance with some embodiments. In this example, a game component 1002 in the form of a treasure chest is visually projected out of the display screen and into a 3D space between the screen and a player. The player may be prompted to use his hand to virtually open the treasure chest to trigger a bonus feature. A gesture input interface such as one of those described in connection with FIG. 2B may be used to detect the player's hand movement (e.g., virtually lifting the lid of the treasure chest) and in response cause additional game components 1004 to be stacked on top of other displayed game components, which may increase payout.

Figure 11A:
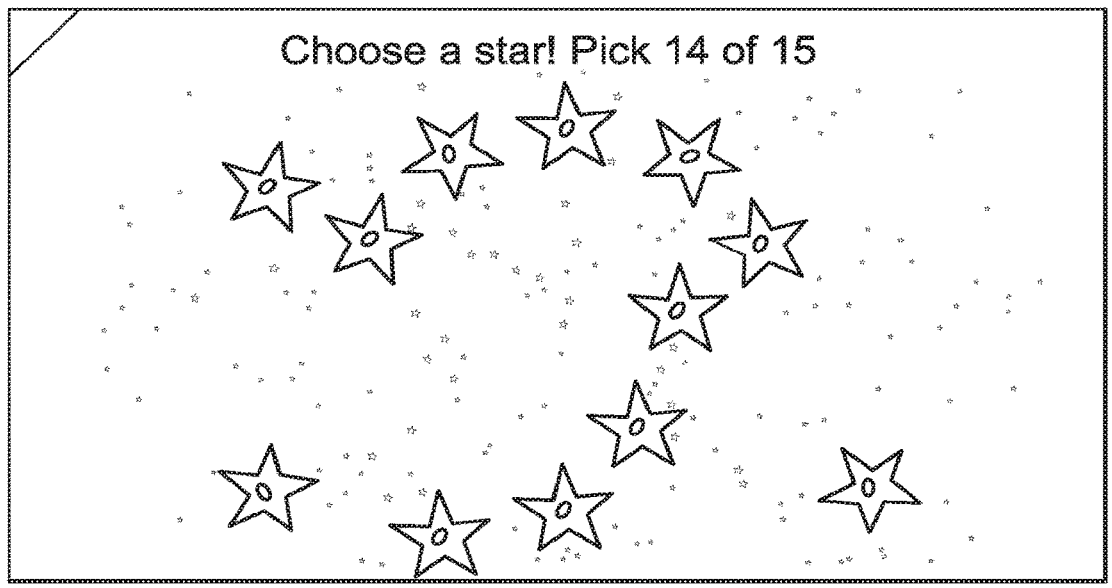
FIGS. 11A-B show an illustrative example of a bonus game in which a gesture input interface may be used to enhance a player's experience, in accordance with some embodiments.
Figure 11B:

FIGS. 11A-B show an illustrative example of a bonus game in which a gesture input interface may be used to enhance a player's experience, in accordance with some embodiments. In this example, the bonus game involves a player selecting 3D symbols in the shape of stars (e.g., as shown in FIG. 11A). It should be appreciated that the use of stars is merely illustrative, as any other suitable symbols or combinations of symbols may also be used.

In some embodiments, the stars may be visually projected out of the display screen and may be moving in a 3D space between the screen and a player. The player may be prompted to use his hand to virtually capture one or more of the stars. A gesture input interface such as one of those described in connection with FIG. 2B may be used to detect the player's hand movement. The gaming system may be configured to determine whether the location of the player's hand matches the location of a moving star at some moment in time. If a match is detected, the gaming system may determine that the player has virtually caught a star and may display the star at a separate portion of the screen (e.g., as shown in FIG. 11B).

In some embodiments, the stars may be of different types, where each type may be of a different color, shape, size, etc. The player may win a prize for collecting a particular number of stars of the same type. For example, the player may need to collect five stars of a certain type to win a corresponding level. The stars of a higher level (e.g., a level associated with higher payout) may be animated differently so as to make them more difficult to capture. For example, such stars may move more quickly, take more turns, etc.

In some embodiments, a gaming system may be configured to detect a physical object. In response to detecting the physical object, the gaining system may generate a model for a virtual object corresponding to the physical object, and may use the model to render a display of the virtual object. For example, the physical object may be a player's hand, and the virtual object may be a virtual hand corresponding to the player's hand. Other types of objects may also be detected, as aspects of the present disclosure are not limited to the detection of any particular type of object.

A physical object may be detected using any combination of one or more sensing techniques, including, but not limited, an optical camera-based technique, an infrared camera-based technique, a laser-based technique, and/or an ultrasound-based technique. For example, the gaming system may include one or more sensor devices configured to detect the physical object and output sensor information regarding one or more characteristics of the physical object. In some embodiments, a sensor device may include one or more onboard processors configured to process raw sensor data and output processed information. As one example, an onboard processor may be configured to apply one or more signal processing techniques such as filtering and/or noise reduction. As another example, an onboard processor may be configured to process multiple sensor signals (e.g., from two or more different sensors in a sensor array) and output a derived signal (e.g., with improved signal quality and/or additional information such as depth information). However, it should be appreciated that aspects of the present disclosure are not limited to the use of an onboard processor, as in some embodiments a sensor device may output raw sensor data instead of, or in addition to, processed information.

A sensor device may be configured to detect any suitable characteristic or combination of characteristics of a physical object. As one example, a sensor device may be configured detect one or more geometric characteristics of the physical object (e.g., shape and/or size in 2D or 3D). As another example, a sensor device may be configured to output non-geometric information such as color and/or texture. However, it should be appreciated that aspects of the present disclosure are not limited to the detection of any particular characteristic, as a gaming system may be configured to detect any information about a physical object that may be useful in generating a model for a virtual object corresponding to the physical object.

In some embodiments, a gaming system may be configured to use information detected from a physical object to generate a model for a virtual object so as to replicate the physical object in a virtual environment. For instance, the model for the virtual object may be constructed so that the virtual object, when rendered on a display, exhibits one or more geometric and/or non-geometric characteristics of the physical object. As an example, the physical object may be a player's hand, and the virtual object may be a virtual hand that matches the detected physical hand in size, shape, skin tone, etc. As another example, the physical object may be a player's head, and the virtual object may be a virtual head that matches the detected physical head in size, shape, facial expression, gender, race, skin tone, hair style, hair color, etc. As yet another example, the physical object may be an inanimate object, such as a pen, cup, card, etc. Such an object may, although need not, be held in a player's hand and placed into a d of view of a sensor device.

A model generated by a gaming system may have any suitable number of dimensions, such as 2D or 3D. Likewise, a virtual object may be displayed in any suitable number of dimensions, such as 2D or 3D. It should be appreciated that the display of a virtual object need not have the same dimensionality as a model for the virtual object. For example, the gaming system may generate a 3D model for the virtual object and use the 3D model, to render a 2D display of the virtual object.

In some embodiments, an output from a sensor device may include a sequence of data sets. For instance, each data set may correspond to a particular point in time. A time stamp may, although need not, be provided for each data set. Alternatively, or additionally, an absolute and/or relative time may be derived for a data set using information such as the sensor device's sampling rate.

In some embodiments, a gaming system may be configured to track one or more aspects of a detected physical object over time. As one example, the physical object may be a player's hand, and the gaming system may be configured to track movement of the hand over time. For instance, the gaming system may be configured to recognize a point on the hand as a certain joint defined in a skeleton model, and track movement of the point over time. Alternatively, or additionally, the gaining system may be configured to recognize a segment between two points on the hand as a certain bone defined in a skeleton model, and track movement of the segment over time. Any suitable type of movement may be tracked, including, but not limited to, translational movement, rotational movement, and/or one or more transformations (e.g., opening and/or closing of the hand).

In some embodiments, a gaming system may be configured to use information detected from a physical object to update a model for a virtual object so as to replicate, in a virtual environment, the physical object's behavior. For instance, the model for the virtual object may be updated so that the virtual object, when rendered on a display, mimics one or more behaviors detected from the physical object.

As an example, the physical object may be a player's hand, and the virtual object may be a virtual hand. The gaming system may be configured to use movement information detected from the player's hand (e.g., tracked movement of one or more points, segments, etc.) to update the model for the virtual hand so that the virtual hand mimics the movement of the physical hand (e.g., pointing, opening palm, etc.). As another example, the physical object may be a player's head, and the virtual object may be a virtual head. The gaming system may be configured to use movement information detected from the player's head (e.g., tracked movement of one or more facial features) to update the model for the virtual head so that the virtual head mimics the movement of the physical head (e.g., blinking, smiling, nodding, shaking, etc.).

In some embodiments, a gaming system may be configured to match a detected physical object to an object type from multiple recognizable object types. For instance, the gaming system may be configured to match the physical object to an object type based on one or more geometric characteristics of the physical object. As one example, the gaming system may receive sensor information representing an image of the physical object and apply one or more image processing techniques (e.g., edge detection) to determine a shape of the physical object (e.g., cube, sphere, cylinder, disk, etc.). The shape may then be compared against multiple known shapes to identify one or more best matches.

In some embodiments, a gaming system may be configured to generate a model for a virtual object based on an object type of a physical object. For instance, a gaining system may be configured to match the physical object to an object type from multiple recognizable object types, and use the Object type to identify a suitable model fax the virtual object. Any suitable object types may be available, including, but not limited to, hand, wand, racket, club, bat, paddle, rod, card, and/or smartphone. It should be appreciated that a selected object type need not accurately represent a detected physical object. For instance, a gaming system may match a physical pen held in a player's hand to an object type of "wand."

In some embodiments, a gaming system may include one or more model templates, for example, a different model template for each object type among multiple recognizable object types. The gaining system may be configured to select a model template based on an object type matching a detected physical object, and instantiate the selected template with one or more parameters obtained from sensor information. For instance, the physical Object may be a player's hand and may be matched to an object type "human left hand" or "human right hand." A model template may be selected accordingly, and may be instantiated based on one or more detected geometric characteristics (e.g., distances between identified joints) and/or non-geometric characteristics (e.g., skin tone). However, it should be appreciated that aspects of the present disclosure are not limited to the use of model templates, as in some embodiments a model for a virtual Object may be generated without using any stored template.

In some embodiments, a gaming system may be configured to detect an interaction between a virtual game component and a virtual object corresponding to a physical object. For example, the gaming system may be configured to detect movement of the physical object and update a model for the virtual object according to the movement of the physical object. In some embodiments, the gaining system may be further configured to monitor the location of the virtual game component and the location of the virtual object, and to determine whether there is a collision between the virtual game component and the virtual object. For instance, the physical object may be a player's hand and the virtual object may be a virtual hand that mimics movement of the player's hand, and the virtual game component may be a virtual coin falling from a virtual coin fountain. The gaming system may be configured to monitor the location of the virtual coin and the location of the virtual hand, and to determine whether the virtual coin is going to hit the virtual hand.

In some embodiments, the gaming system may be configured to associate a vector field (e.g., a magnetic field) with a virtual object corresponding to a physical object. In this manner, a virtual game component moving towards the virtual object may change speed and/or direction as if being influenced by forces according to the vector field. As one example, the virtual game component may slow down (respectively, speed up) as if being pushed (respectively, pulled) by a greater and greater force as the virtual game component approaches the virtual object. For instance, the behavior may be similar to that between opposite magnetic poles (respectively, that between a magnet and iron filings). As another example, the virtual game component may stay attached to the virtual object after initial contact with the virtual object as if being attracted by a magnet.

Additionally, or alternatively, the gaming system may be configured to associate a vector field (e.g., a magnetic field) with the virtual game component. If the virtual game component and the virtual object both have a vector field associated there to, the respective vector fields may be the same or different, and the virtual game component and the virtual object may behave according to interactions between virtual forces of the two vector fields.

In some embodiments, the virtual game component may be a 3D virtual game component in a 3D scene of a game, and the virtual object may be a 3D virtual object. Accordingly, a vector field associated with the virtual game component or the virtual object may be a 3D vector field. However, aspects of the present disclosure are not limited to any particular dimensionality, as in some embodiments the scene of the game, the virtual game component, the virtual object, and/or the vector field may be in 2D. It should also be appreciated that aspects of the present disclosure are not limited to the use of a vector field.

Figure 12A:
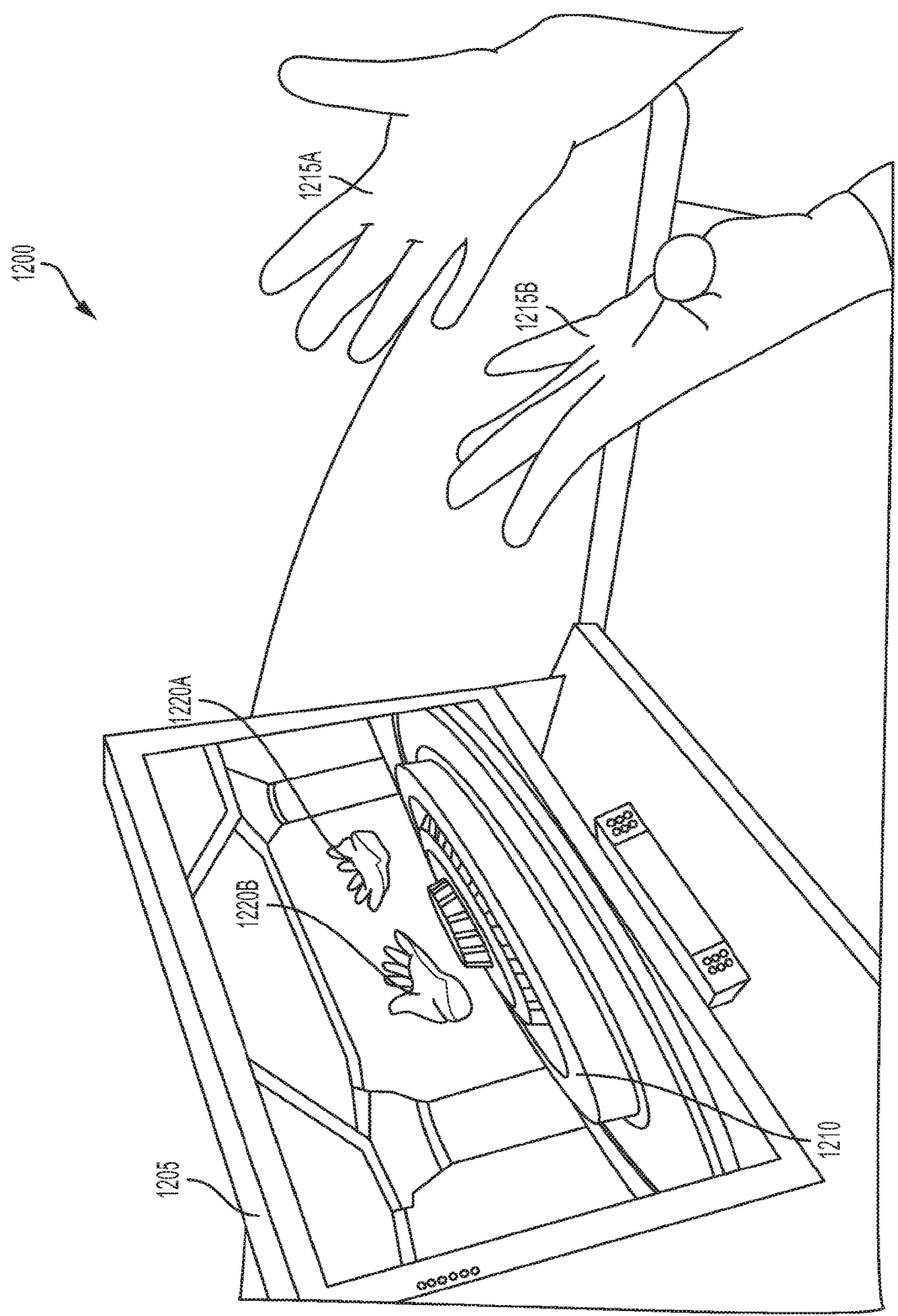
FIG. 12A shows an illustrative gaming system 1200, in accordance with some embodiments.

FIG. 12A shows an illustrative gaming system 1200, in accordance with some embodiments. In this example, the gaining system 1200 includes a display 1205, which may be a 2D or 3D display. The gaming system 1200 may be configured to cause the display 1205 to display a 2D or 3D scene of a game, such as an illustrative roulette game with a roulette wheel 1210 as shown in FIG. 12A. However, it should be appreciated that aspects of the present disclosure are not so limited, as any suitable game may be displayed, such as any pattern game or card game.

In the example of FIG. 12A, the gaming system 1200 includes a sensor device (not shown) configured to detect objects within a field of view of the sensor device. Depending on a sensing technology used by the sensor device, a range of detection may be on the order of a few millimeters, centimeters, decimeters, or meters. Moreover, the field of view may be above, below, or at any suitable angle relative to the sensor device. In some embodiments, a player may place his hands 1215A and 1215B within the field of view of the sensor, and the gaming system may be configured to process information output by the sensor device (e.g., coordinate information for the physical hands 1215A and 1215B), and render on the display 1205 virtual hands 1220A and 1220B corresponding, respectively, to the physical hands 1215A and 1215B.

Figure 12B:
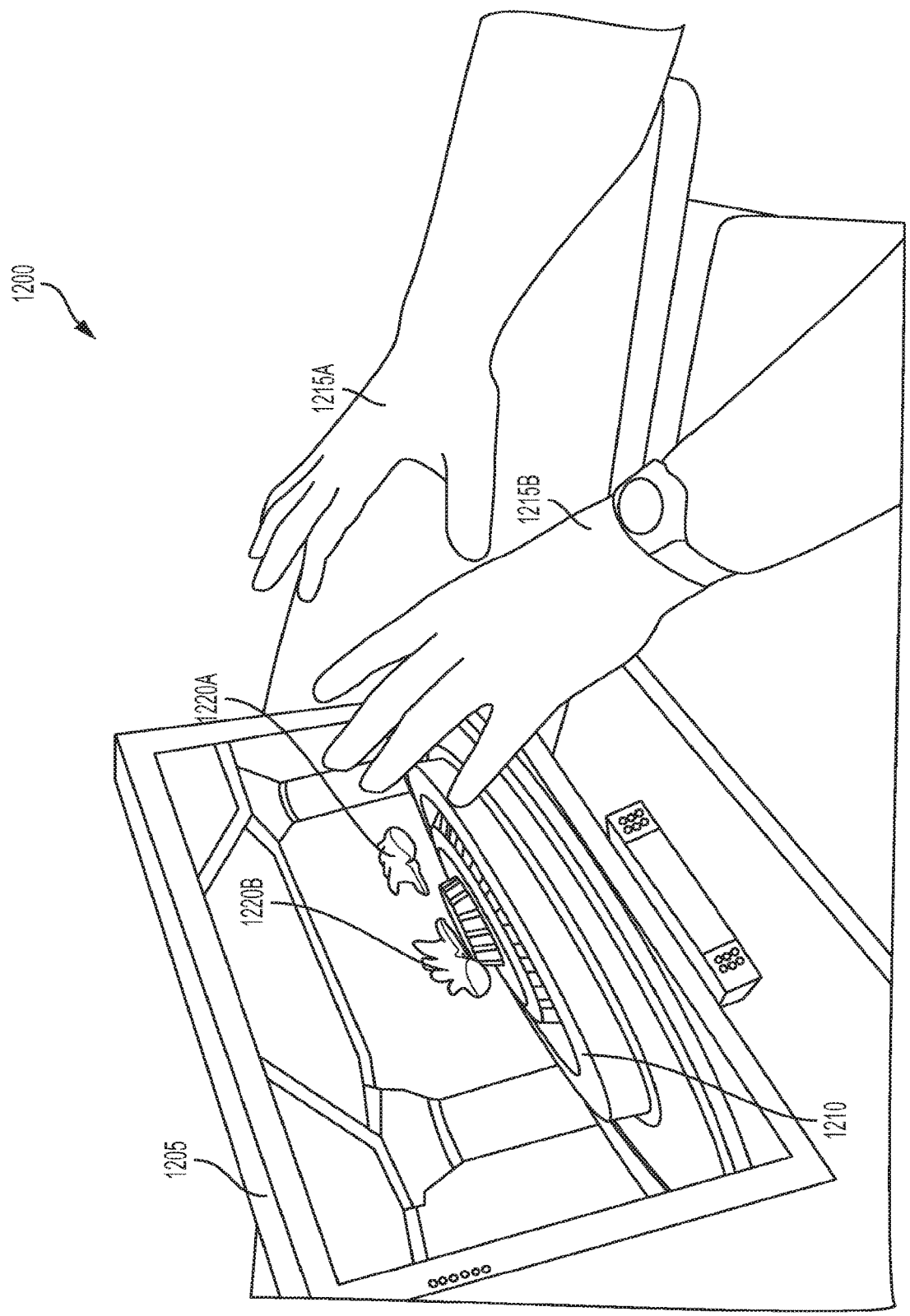
FIG. 12B shows the illustrative gaming system 1200 of FIG. 12A at a different point in time, in accordance with some embodiments.

FIG. 12B shows the illustrative gaming system 1200 of FIG. 12A at a different point in time, in accordance with some embodiments. In this example, the player has moved his hands 1215A and 1215B so that the palms are pointing down, as opposing to pointing up as in FIG. 12A. The gaining system may be configured to detect such movements by processing information output by the sensor device over time, and to update models for the virtual hands 1220A and 1220B to mimic the movements of the physical hands 1215A and 1215B.

It should be appreciated that the techniques described herein are not limited to being used in connection with the illustrative gaming system 1200 shown in FIG. 12A-B. Any one or more of such techniques may be used in connection with any gaming system, including, but not limited to, the illustrative electronic gaming machine 10 shown in FIG. 1A.

Figure 13:
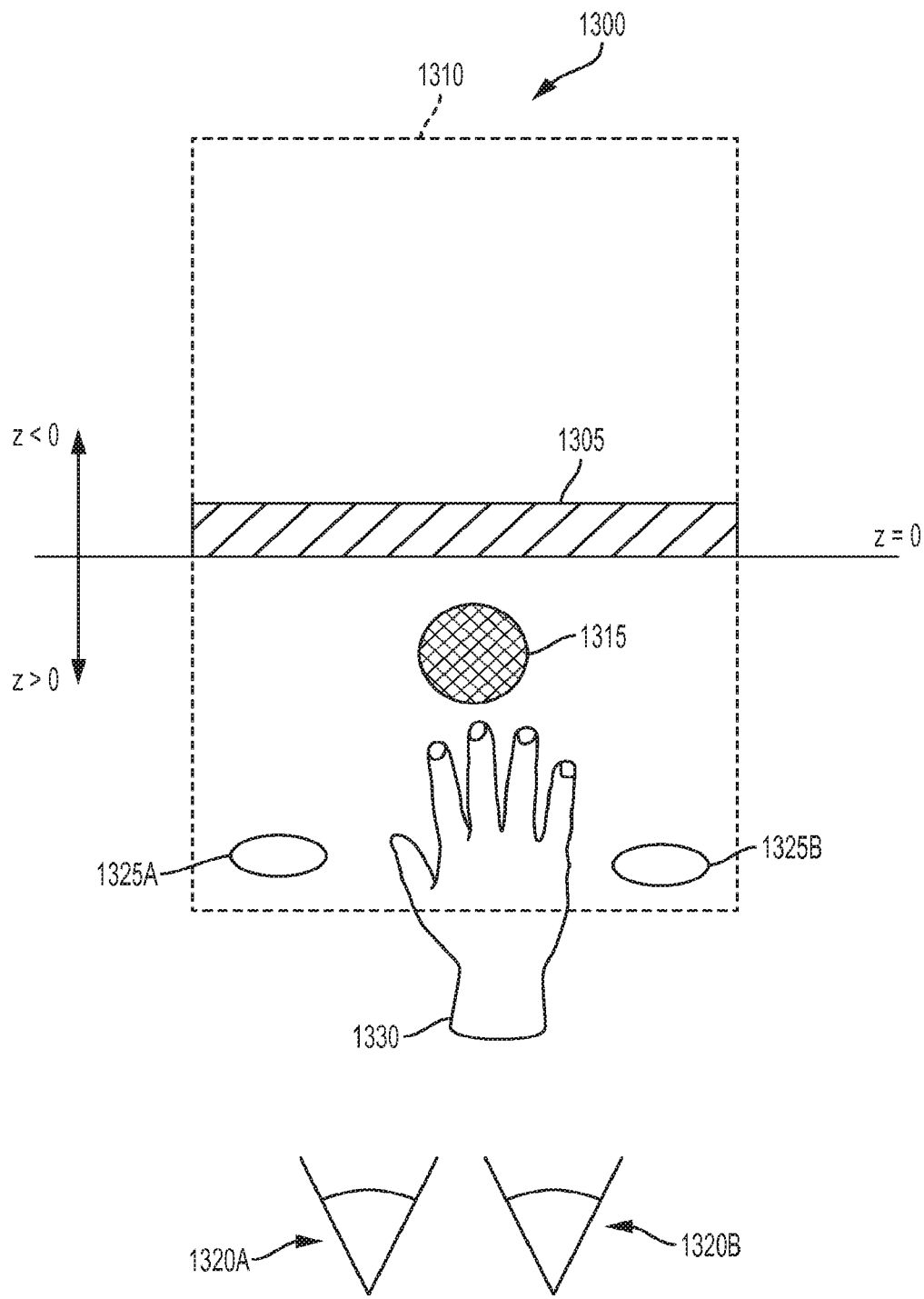
FIG. 13 shows a top view of an illustrative 3D gaming system 1300, in accordance with some embodiments.

FIG. 13 shows a top view of an illustrative 3D gaming system 1300, in accordance with some embodiments. In this example, the gaming system 1300 includes a 3D display 1305 and is configured to cause the display 1305 to display one or more 3D game components within a 3D display region 1310. The display region 1310 may extend towards a player and/or behind the display 1305. For instance, a virtual ball 1315 may appear to be hovering in front of the display 1305, when viewed from viewing positions 1320A and 1320B (for the player's left eye and right eye, respectively).

In the example of FIG. 13, the gaming system 1300 includes sensors 1325A and 1325B, which may be incorporated into a common housing, or may be separately housed. The sensors 1325A and 1325B may use any suitable combination of one or more sensing techniques, including, but not limited to, optical, thermal, radio, and/or acoustic techniques. For example, each of the sensors 1325A and 1325B may include one or more emitters for emitting waves such as sound waves and/or electromagnetic waves (e.g., visible light, infrared radiation, radio waves, etc.), and/or one or more detectors (e.g., cameras) for detecting waves that bounce back from an object.

The sensors 1325A and 1325B may be arranged in any suitable manner. For example, as shown in FIG. 13, the sensors 1325A and 1325B may be placed between the display 1305 and the player, so that a 3D field of view of the sensors 1325A and 1325B at least partially overlap with the display region 1310. In this manner, the sensors 1325A and 1325B may "see" the player's hand 1330 when the player reaches into the display region 1310 to virtually touch the virtual ball 1315.

In some embodiments, the gaming system 1300 may be configured to process information output by the sensors 1325A and 1325B (e.g., coordinate information for the physical hand 1330) and generate a model for a virtual hand based on the sensor information. Rather than causing the virtual hand to be displayed visibly, the gaming system 1300 may, in some embodiments, simply use the model for the virtual hand to induce interactions with game components. For example, the locations of the sensors 1325A and 1325B relative to the display 1305 may be known, and the gaming system 1300 may be configured to used that location information along with the sensor information to determine a location of the physical hand 1330 relative to the display 1305. The virtual hand, although not visibly rendered, may be placed at the same location as the physical hand 1330. In this manner, the gaining system 1300 may be able to use techniques such as collision detection to allow the physical hand 1330 to interact with one or more game components, such as the virtual ball 1315. For example, the player may move the physical hand 1330 towards the virtual ball 1315, and the gaming system 1300 may be configured to update the position of the virtual hand accordingly. When the physical hand 1330 reaches the virtual ball 1315, the virtual hand may also reach the virtual ball 1315, and a collision between the virtual hand and the virtual ball 1315 may be detected.

In some embodiments, the gaming system 1300 may be configured to activate a game rule or otherwise trigger an event in response to detecting an interaction between the virtual ball 1315 and the virtual hand. For instance, the gaining system 1300 may be configured to update a model for the virtual ball 1315 so as to cause one or more changes in the appearance of the virtual ball 1315. As one example, the gaming system 1300 may be configured to update the model for the virtual ball 1315 so that an indentation appears where the collision between the virtual ball 1315 and the virtual hand is detected. As another example, the gaming system 1300 may be configured to update the model for the virtual ball 1315 so that the virtual ball 1315 is deformed as if being squished. As another example, the gaming system 1300 may be configured to update the model for the virtual ball 1315 so that the virtual ball 1315 changes color. The change in color may take place uniformly over the virtual ball 1315, or with a gradation (e.g., changing most drastically where the collision between the virtual ball 1315 and the virtual hand is detected, and fading radially outward from that location).

In some embodiments, the gaming system 1300 may be configured to update the model for the virtual ball 1315 so as to animate a change to the appearance of the virtual ball (e.g., size, shape, color, etc.). However, that is not required, as in some embodiments one or more changes may be shown instantaneously.

It should be appreciated that the specific example of a virtual ball is shown in FIG. 13 and discussed above solely for purposes of illustration, as the techniques described herein may be used to allow a player to interact with any suitable game component in any suitable manner. As one example, a gaming system may allow a player to use his physical hand to push one or more virtual buttons, where a virtual button may be activated when the gaming system detects a collision between the virtual button and a virtual hand corresponding to the physical hand. The gaming system may be further configured to activate a game rule or otherwise trigger an event when such a collision is detected. Likewise, in some embodiments, a gaming system may allow a player to use his physical hand to pull one or more virtual levers (or turn one or more virtual knobs) by detecting a collision between the virtual level (or knob) and one or more fingers of a virtual hand corresponding to the physical hand, and/or rotational movement of the physical hand in a direction corresponding to the virtual lever being pulled (or the virtual knob being turned).

As another example, a gaming system may allow a player to use his physical hand to collect one or more virtual coins falling from a virtual coin fountain, where a virtual coin may be deemed to have been collected by the player when the gaming system detects a collision between the virtual coin and the palm of a virtual hand corresponding to the physical hand.

As another example, a gaming system may allow a player to use his physical hand to draw a virtual curtain by detecting a collision between the virtual curtain and one or more fingers of a virtual hand corresponding to the physical hand, and/or translational movement of the physical hand in a direction corresponding to the virtual curtain being opened or closed.

As another example, a gaming system may allow a player to use his physical hand to spin a virtual wheel of fortune by detecting a collision between the virtual wheel and one or more fingers of a virtual hand corresponding to the physical hand, and/or movement of the physical hand in a direction corresponding to the virtual wheel being spun. In some embodiments, the gaining system may be configured to control the spinning of the virtual wheel according to a virtual acceleration calculated based on a detected acceleration of the physical hand. However, that is not required, as in some embodiments a virtual acceleration of the virtual wheel may be randomly determined.

As another example, a gaming system may allow a player to use his physical hand to move a virtual game component (e.g., a virtual 3D symbol) and place the game component at a designated location within a virtual scene of a game (e.g., a virtual receptacle shaped to receive the virtual 3D symbol), by detecting a collision between the virtual game component and one or more fingers of a virtual hand corresponding to the physical hand, and/or movement of the physical hand consistent with moving the virtual game component from a current location to the designated location.

As another example, a gaming system may allow a player to use his physical hand to move a physical object (e.g., a physical cube) and place the physical object at a designated location within a virtual scene of a game (e.g., where a first virtual cube shaped to match the physical cube is displayed). For instance, the gaming system may be configured to generate a model for a second virtual cube, and cause the second virtual cube to move in the virtual scene in a manner that matches detected movement of the physical cube. The gaming system may activate a game rule or otherwise trigger an event in response to detecting that the position and/or orientation of the first virtual cube matches that of the second virtual cube.

Another example, a gaining system may allow a player to use his physical hand to unlock a virtual lock using a physical object. For instance, in some embodiments, the gaming system may be configured to detect a physical object held in the player's hand (e.g., pen, key, wand, etc.) and link the physical object to a model of a virtual key. As movement of the physical object is detected, the gaining system may be configured to update the model (lithe virtual key to mimic the movement of the physical object, such as being inserted into the virtual lock and/or turning.

Another example, a gaining system may allow a player to use his physical hand to unlock a virtual lock using a virtual key. For instance, in some embodiments, the gaming system may be configured to detect a collision between the virtual key and one or more fingers of a virtual hand corresponding to the physical hand, and/or movement of the physical hand corresponding to the virtual key being inserted into the virtual lock and/or turning.

It should be appreciated that in all of the examples discussed above in connection with FIG. 13, the virtual object corresponding to a detected physical object may be visible or invisible, as aspects of the represent disclosure are not so limited. Also, a location of the virtual object may or may not coincide with a location of the corresponding physical object.

Figure 14:
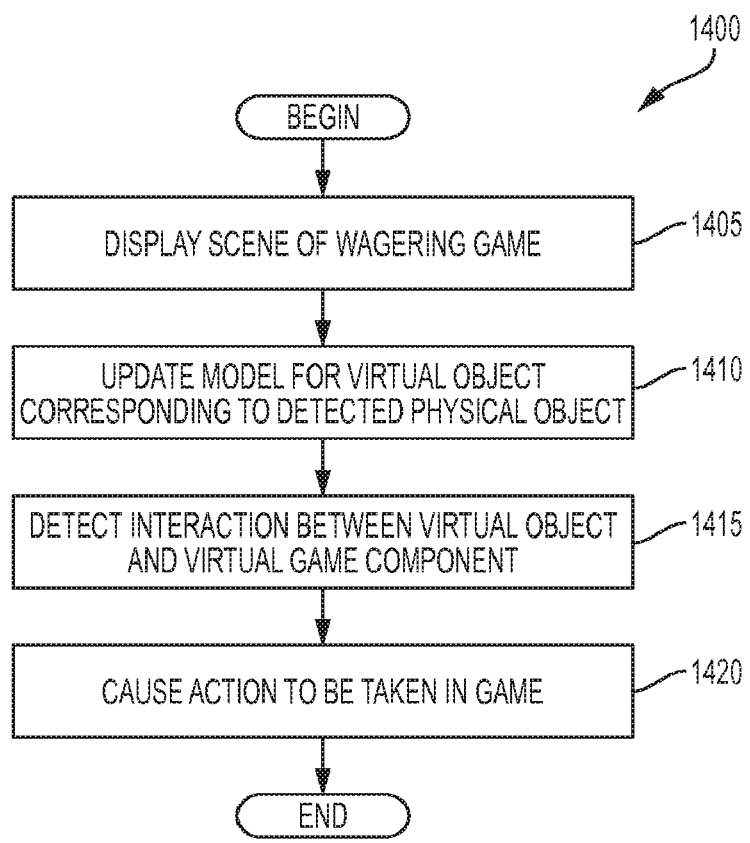
FIG. 14 shows an illustrative process 1400 that may be performed by a gaming system, in accordance with some embodiments.

FIG. 14 shows an illustrative process 1400 that may be performed by a gaming system, in accordance with some embodiments. For example, the process 1400 may be performed by the illustrative gaining systems 1200 and 1300 described above in connection with FIGS. 12A-B and 13, respectively, to allow a player to interact with one or more virtual game components.

At act 1405, the gaming system may cause a scene of a wagering game to be displayed, for example, on a 3D display such as a thin film transistor (TFT) display. In some embodiments, the 3D display may be configured to cause a player to visually perceive one or more virtual game components in a display region (e.g., the illustrative display region 1310 shown in FIG. 13) that extends towards the player and/or behind the 3D display.

At act 1410, the gaming system may update a model (e.g., a 3D volumetric model) for a virtual object corresponding to a detected physical Object, such as an anatomical feature of a player (e.g., hand, finger, etc.) or a tool held by the player (e.g., cup, pen, wand, baton, gavel, etc.). For example, the detected physical object may be a physical hand, and the model may be a skeleton model comprising a wrist joint, a palm, and/or one or more joints and/or bones for one or more fingers. However, it should be appreciated that aspects of the present disclosure are not limited to the use of a skeleton model, as in some embodiments a hand may be modeled as 3D body having a certain contour.

In some embodiments, the gaming system may receive information from one or more sensor devices (e.g., the illustrative sensors 1325A-1325B shown in FIG. 13) and may use the received information to update the model for the virtual object. For example, the received information may indicate a location of the detected physical object. The location may be expressed in any suitable coordinate system (e.g., Cartesian, polar, spherical, cylindrical, etc.) with any suitable units of measurement (e.g., inches, centimeters, millimeters, etc.).

In some embodiments, multiple physical Objects may be detected, and the received sensor information may indicate multiple corresponding locations. For example, the game may be a multi-player game, and objects associated respectively with different players may be detected by a same sensor device or different sensor devices.

It should be appreciated that location information is merely one example of information that may be received from a sensor device. Additionally, or alternatively, a sensor device may provide information indicative of a non-geometric characteristic of the detected physical object, such as color and/or texture.

In some embodiments, updating the model of a virtual object may include updating a location occupied by the virtual object within the display region. For example, the gaming system may be configured to use information detected from the physical object to update the model tier the corresponding virtual object so as to replicate the physical object's behavior. For instance, the model for the virtual object may be updated so that the virtual object mimics one or more behaviors detected from the physical object.

Returning to FIG. 14, the gaming system may, at act 1415, detect an interaction between a virtual game component and a virtual object corresponding to a detected physical object. For instance, the gaming system may be configured to monitor the location of the virtual game component and the location of the virtual object, and to determine whether there is a collision between the virtual game component and the virtual object. As one example, the physical object may be a player's hand and the virtual object may be a virtual hand that mimics movement of the player's hand, and the virtual game component may be a virtual roulette ball. The gaming system may be configured to monitor the location of the virtual roulette ball and the location of the virtual hand, and to determine whether the virtual hand is picking up the virtual roulette ball. The gaming system may be further configured to monitor a movement of the virtual hand (which may mimic the movement detected from the physical hand) to determine whether and how the virtual hand is tossing the virtual roulette ball into a roulette wheel. For example, the gaming system may be configured to use a direction and/or acceleration of the virtual hand's movement to determine a trajectory and/or speed of the virtual roulette ball.

As another example, the virtual game component may include one or more virtual gaming chips. The gaining system may be configured to monitor the location of the one or more virtual gaming chips and the location of the virtual hand, and to determine whether the virtual hand is moving the one or more virtual gaming chips, which may indicate that the player intends to place a bet. In some embodiments, the gaming system may be configured to monitor the movement of the virtual hand (which may mimic the movement detected from the physical hand) to determine where the one or more virtual gaining chips are being moved, which may indicate on what the player is placing the bet (e.g., one or more numbers in a roulette game). In some embodiments, the gaming system may be configured to determine how many virtual gaming chips are being moved by the virtual hand, which may indicate an amount of the player's bet.

At act 1420, the gaming system may cause one or more actions to be taken in the wagering game based on the interaction detected at act 1415. For instance, in the roulette wheel example discussed above in connection with act 1415, an action may include a bet being placed on behalf of the player on a number, and in an amount, determined at act 1415. As another example, the wagering game may be a juggling game in which the player is to toss multiple virtual objects in the air and catch the virtual objects as the Objects fall back down. The gaming system may be configured to detect collisions between virtual hands corresponding respectively to the player's left and right hands to determine a number of times the player successfully tosses and/or catches a virtual object, and an action may include awarding a number of points to the player according to the number of times the player successfully tosses and/or catches a virtual object.

In some embodiments, the gaming system may be configured to update the display of the wagering game based on the action taken in the act 1420. Updating the display may include changing an appearance of a virtual object in an existing scene (e.g., spinning a wheel, turning over a card, etc.). Updating the display may also include generating a new scene, for example, by generating a new 3D mesh.

It should be appreciated that the process 1400 shown in FIG. 14 and described above are provided solely for purposes of illustration, as aspects of the present disclosure are not limited to the performance of any particular act or combination of acts described herein. As one example, the wagering game may be a multi-player rock-paper-scissors game (e.g., as a bonus game), and the gaming system may be configured to detect each player's hand gesture and update a model for a respective virtual hand. The gaming system may be configured to match each player's hand gesture to one of three patterns, "rock," "paper," or "scissors," and to determine which, if any, player is a winner. There may be no interaction between a virtual hand and virtual game component. However, the virtual hand associated with a player may be displayed to one or more other players. In this manner, the rock-paper-scissors game may be played between players who may not be able to see each other (e.g., because the players are playing from different locations). As another example, the wagering game may be a music-related game in which a player is to clap his hands to a rhythm to win a prize. The gaming system may be configured to detect collisions between virtual hands corresponding respectively to the player's left and right hands to determine how well the player is able to match the rhythm. In some embodiments, the prize amount may vary depending on a complexity of the rhythm and/or the player's performance.

FIG. 15 illustrates an example of a visual illusion that may be created by a gaining system, in accordance with some embodiments. In this example, a player is using his hand 1505 to hold a physical cup 1510. The physical cup 1510 may be within a field of view of a sensor device of the gaming system, and the gaming system may be configured to detect the present of the physical cup 1510 based on the sensor device's output, and create a model for a virtual cup, for example, using one or more of the techniques described above in connection with FIGS. 13-14. The gaming system may be further configured to position the virtual cup at a same location as the physical cup 1510, and to move the virtual cup according to a detected movement of the physical cup 1510.

In some embodiments, the gaming system may detect an interaction between the virtual cup and a virtual game component, such as a virtual sphere 1515. The gaining system may be configured to adjust an appearance of the virtual sphere 1515 based on the detected interaction, for example, by making the virtual sphere 1515 gradually disappear as if being scooped up by a cup. The virtual cup may be made invisible, so as to create an illusion of the virtual sphere 1515 being scooped up by the physical cup 1510. Other virtual game components may also be used, in addition to, or instead of the virtual sphere 1515, such as virtual coins.

Figure 16A:
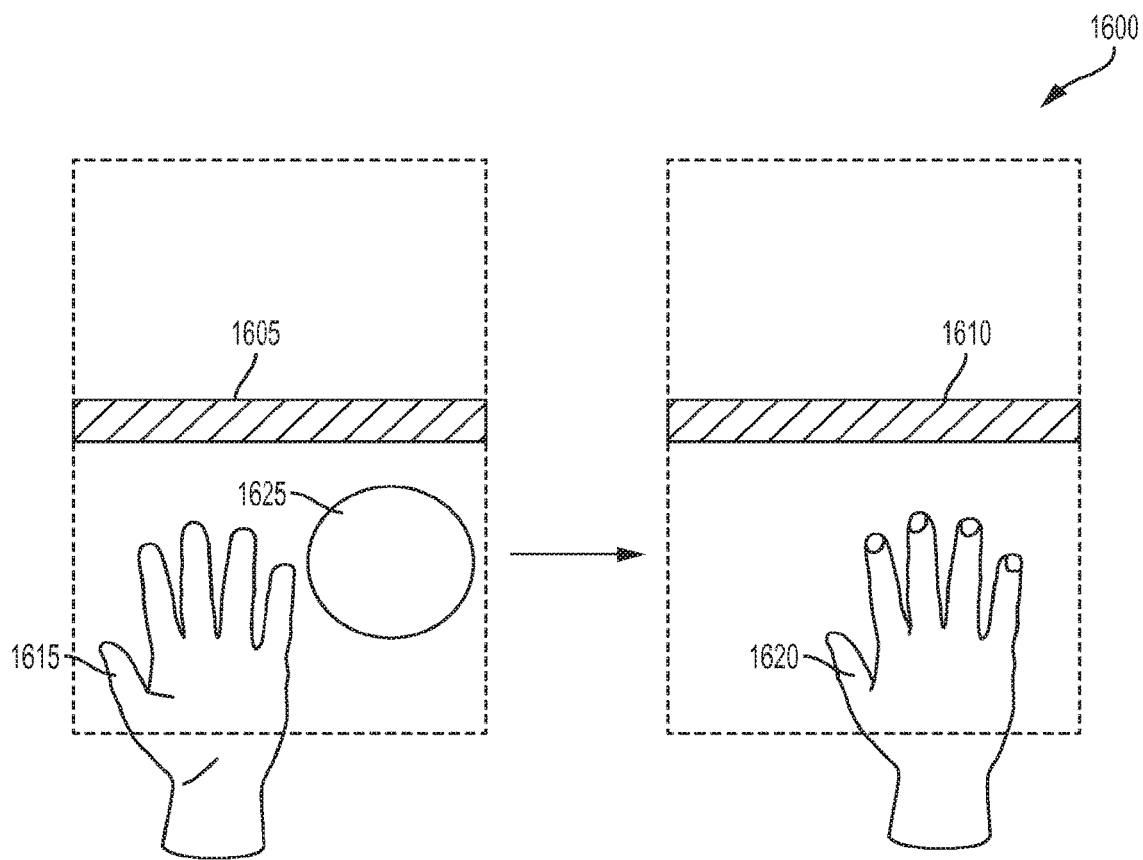
FIGS. 16A-B show an illustrative gaming system 1600 comprising at least two displays and at least two sensor devices, in accordance with some embodiments.

FIG. 16A shows an illustrative gaming system 1600 comprising at least two displays and at least two sensor devices, in accordance with some embodiments. For example, the gaming system may include two electronic gaming machines configured to communicate with each other, where each electronic gaining machine includes at least one display (shown as 1605 and 1610, respectively, in FIG. 16A) and at least one sensor device (not shown). The two electronic gaming machines may, although need not, be placed side by side.

In the example shown in FIG. 16A, the two electronic gaming machines may be used by two different players. For instance, a first player may place his hand 1615 into a field of view of the sensor device of the first electronic gaming machine, while a second player may place his hand 1620 into a field of view of the sensor device of the second electronic gaming machine.

Figure 16B:
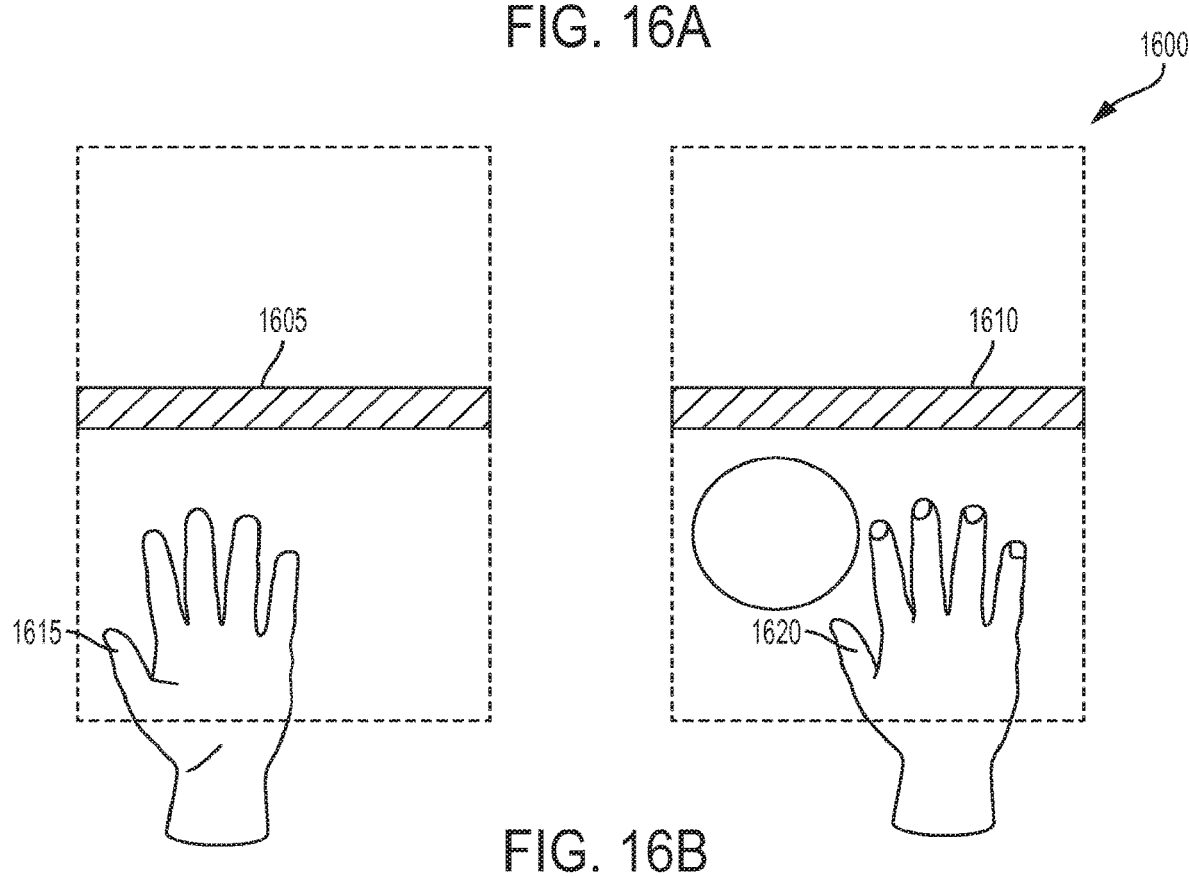

In some embodiments, the two electronic gaming machines may be configured to allow the two players to participate in a multi-player game. For example, the first electronic gaming machine may be configured to detect an interaction between a virtual game component (e.g., a virtual ball 1625), and to create a virtual hand to mimic movement of the physical hand 1615. For example, the first electronic gaining machine may be configured to detect that the physical hand 1615 is moving as if attempting to toss the virtual ball 1625. The first electronic gaming machine may be configured to determine a trajectory and/or speed of the virtual ball 1625 and transmit that information to the second electronic gaining machine. The second electronic gaming machine may display the virtual ball 1625 as if the virtual ball 1625 was tossed from the first electronic gaming machine over to the second electronic gaining machine, for example, as shown in FIG. 16B. The first electronic gaming machine, on the other hand, may show the virtual ball 1625 disappearing as if being tossed outside a display region of the display 1605.

Any suitable game action may result from a virtual game component being "tossed" from one machine to another. For example, an equal reward may be given to each of the two players. Alternatively, a greater reward may be given to the first player who tossed the virtual game component than to the second player who received the virtual game component, or vice versa.

It should be appreciated that the multi-player game described above in connection with FIGS. 16A-B are provided solely for purposes of illustration, as the techniques disclosed herein are not limited to being used with any particular game. For example, the two electronic gaming machines may be used to play a game in which a first player manipulates a series of virtual game components (e.g., by pushing one or more of the virtual game components and/or pulling one or more of the virtual game components), and the second player is to perform the same sequence of manipulations to obtain a reward.

In some embodiments, a multiple-player game may be played on a single machine. For instance, with reference to the example shown in FIGS. 16A-B, the hands 1615 and 1620 may be placed into the field of view of the sensor device of the first electronic gaming machine, which may be configured to allow the hands 1615 and 1620 to interact with one or more game components at the same time. For example, the two players may toss a game component back and forth, or the first player may toss a game component towards a receptacle such as a pot, while the second player may attempt to block the game component from entering the pot.

Figure 17:
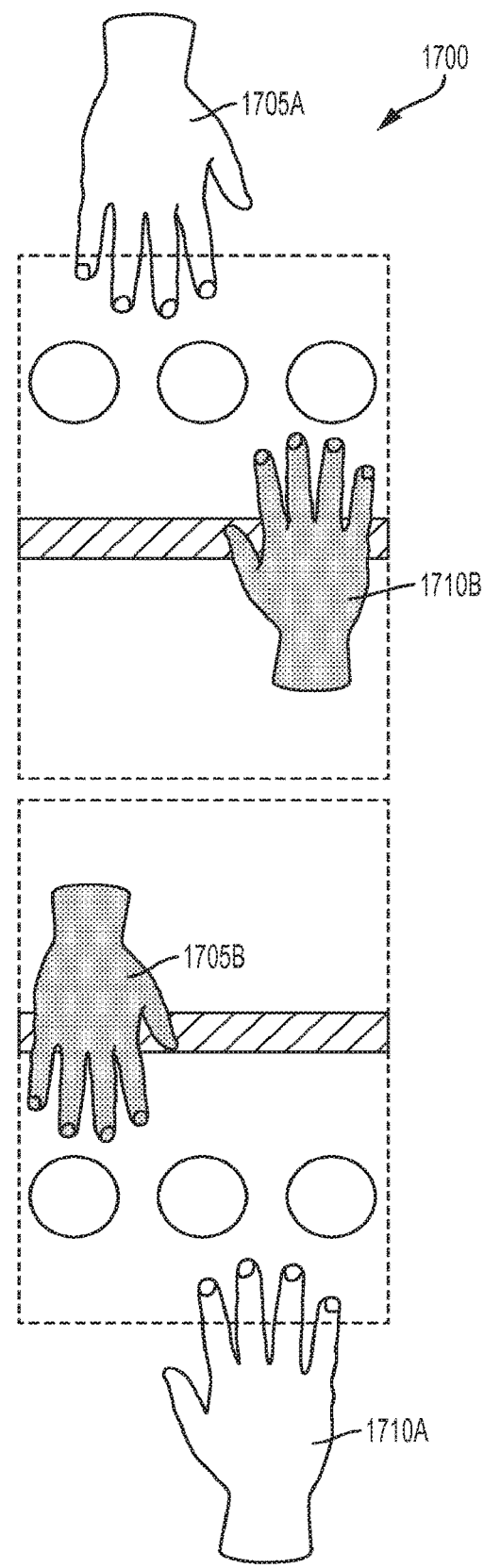
FIG. 17 shows an illustrative gaming system 1700 comprising at least two displays and at least two sensor devices, in accordance with some embodiments.

FIG. 17 shows an illustrative gaming system 1700 comprising at least two displays and at least two sensor devices, in accordance with some embodiments. The gaining system 1700 may be similar to the gaming system 1600 shown in FIG. 16. In some embodiments, the two electronic gaming machines may be placed back to back, or at different locations. The first electronic gaining machine may be configured to detect movement of a first player's hand 1705A and transmit information to the second electronic gaming machine to allow the second electronic gaming machine to create a virtual hand 1705B that mimics the movement of the physical hand 1705A. Likewise, the second electronic gaming machine may be configured to detect movement of a second player's hand 1710A and transmit information to the first electronic gaming machine to allow the first electronic gaming machine to create a virtual hand 1710B that mimics the movement of the physical hand 1710A. In this manner, when the physical hand 1705A pushes a virtual game component away from the first player, the second player may see the virtual game component being pushed towards the second player. In some embodiments, both players may get points if both players push on the same virtual game component at the same time.

In some embodiments, a multi-player game may be played on multiple electronic gaming machines. A player may interact with a virtual game component on that player's machine, and a result of the interaction (e.g., a change in appearance of the virtual game component) may be shown at one or more other machines. This technique may be used, for example, during a bonus game to allow one player to give a hint to another player, or to influence an outcome of the bonus game. As another example, a multi-player poker game may be played on multiple electronic gaming machines, in which each player may hold a respective hand of virtual cards, tilt his hand to look at the virtual cards, push chips towards the center of a virtual table to place a bet, etc. Moreover, in some embodiments, each player may see the chips and/or cards of the other players.

In some embodiments, a gaming system may include an optical sensor such as a barcode (or QR code) reader. A player may place a card, such as a scratch card, having a barcord (or QR code) within a field of view of the barcode (or QR code) reader. The gaining system may be configured to process the information read from the code, for example, to determine if the code represents a winning combination. If it is determined that the code represents a winning combination, the gaming system may create a virtual card and integrate the virtual card into a scene of a game. Additionally, or alternatively, the gaining system may initiate a bonus playoff, where the information read from the card may be used to select a type of bonus playoff and/or one or more bonus rules.

In some embodiments, adjustment computations may be performed by one or more processors of a wagering gaming apparatus to compensate for differences between the player's viewpoint and the virtual camera location when detecting intended interactions between physical objects and virtual game components projected in 3D. Consider, for example, the case illustrated in FIG. 20A. Here, although the player's viewpoint 1840 is offset vertically below the z-axis, the virtual camera 1800 is fixed at y=0 on the z-axis, as described earlier above. In this case, although virtual game component 1810 is also located at the z-axis (y=0) in the virtual 3D model, it appears to the player as if it were projected below the z-axis, along a line from the player's viewpoint 1840 to the screen origin. Thus, if the player intends to interact with virtual game component 1810 using, e.g., the player's hand or another physical object, the player would reach toward the perceived location of virtual game component 1810 below the z-axis, rather than its location at the z-axis as in the virtual 3D model.

The inventors have recognized and appreciated that in such a scenario, it may be beneficial to apply a transformation to the coordinates of the virtual game component within the virtual 3D model, and/or to the physical location of the player's hand or other physical object detected by one or more sensor devices, so that the locations and movements of the virtual game component and the physical object can be compared in a player-view space in which the transformed locations of the virtual game component and the physical object will collide when the player intends an interaction and perceives the physical object as touching the virtual game component. In some embodiments, for example, transformed coordinates for the virtual game component may be computed by offsetting the coordinates of the virtual game component in the virtual 3D model by a vector representing the difference between the player's viewpoint and the virtual camera location. An intended interaction between a physical object such as the player's hand or another anatomical feature of the player and the virtual game component may then be detected when the sensed location of the physical object approaches the transformed location of the virtual game component (i.e., in the player-view space resulting from fire transformation).

Figure 23:
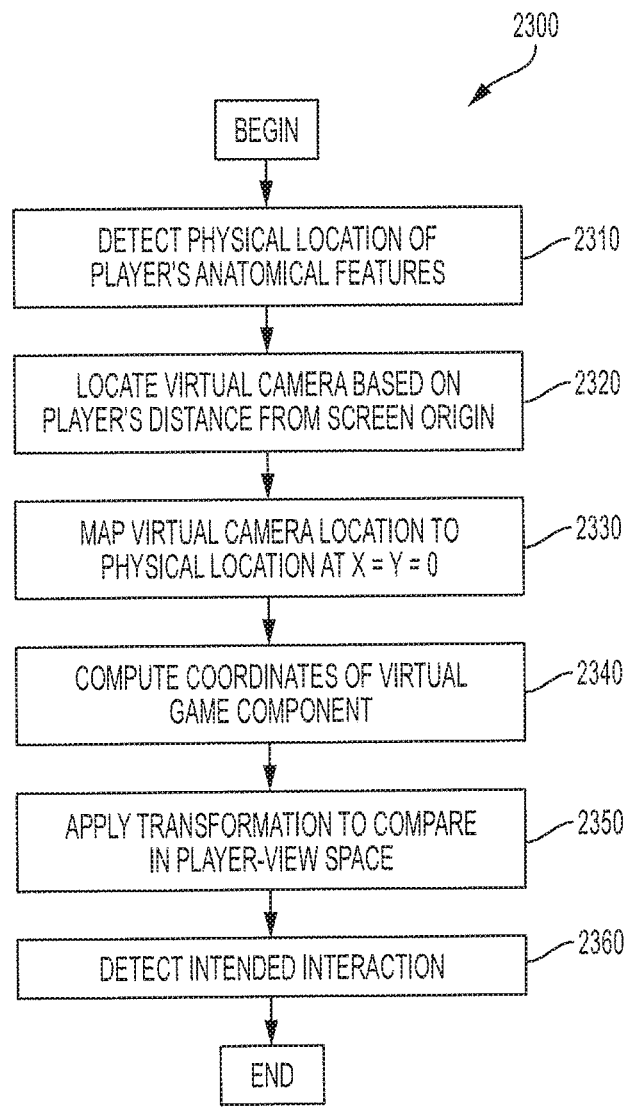
FIG. 23 illustrates an exemplary method for detecting an intended interaction with a virtual 3D game component that may be performed by a gaming system, in accordance with some embodiments.

Thus, it should be appreciated that one embodiment is directed to a method 2300 for detecting an intended interaction between a physical object and a 3D virtual game component, as illustrated in FIG. 23. Method 2300 may be performed, for example, by one or more components of a wagering gaining apparatus, although other implementations are possible, as method 2300 is not limited in this respect. Method 2300 begins at act 2310, at which physical locations of a player's anatomical features may be detected, e.g., by sensor devices of the wagering gaming apparatus. In some embodiments, these may include a first anatomical feature sensed by a first sensor device, and a second anatomical feature sensed by a second sensor device. The first anatomical feature in some embodiments may be located on the player's head, and in some embodiments may be one or both of the player's eyes. The second anatomical feature in some embodiments may be located on the player's hand. In some embodiments, as discussed above, the second sensor device sensing the physical object such as the player's hand may be a contactless sensor device.

At act 2320, the distance between the player's viewpoint (the physical location of the first anatomical feature of the player sensed by the first sensor device) the origin position on the screen may be detected, and the virtual 3D camera for generating the 3D scene may be located at a distance Z from the origin position in the virtual 3D model, specified based on the detected distance between the player's viewpoint and the screen origin. At act 2330, the virtual camera location may be mapped to a physical location at coordinates (x, y, z)=(0, 0, Z) from the screen origin. With this mapping, corresponding coordinates for the location of a virtual game component in the 3D scene may be computed at act 2340.

At act 2350, a transformation may be applied to compare the physical location of the physical object such as the second anatomical feature of the player (e.g., the player's hand) with the location of the virtual game component in player-view space. The transformation may be based on the difference between the mapped physical location of the virtual 3D camera (0, 0, Z) and the sensed physical location of the player's first anatomical feature (e.g., the player's viewpoint), and may be applied to the coordinates of the virtual game component and/or to the sensed physical location of the player's second anatomical feature (e.g., the player's hand). At act 2360, an intended interaction between the player's second anatomical feature (e.g., the player's hand) and the virtual game component may be detected when the sensed physical location of the anatomical feature approaches the location of the first virtual game component in the player-view space resulting from the transformation.

It should be appreciated that the various concepts disclosed above may be implemented in any of numerous ways, as the concepts are not limited, to any particular manner of implementation. For instance, the present disclosure is not limited to the particular arrangements of components shown in the various figures, as other arrangements may also be suitable. Such examples of specific implementations and applications are provided solely for illustrative purposes.

Figure 7:
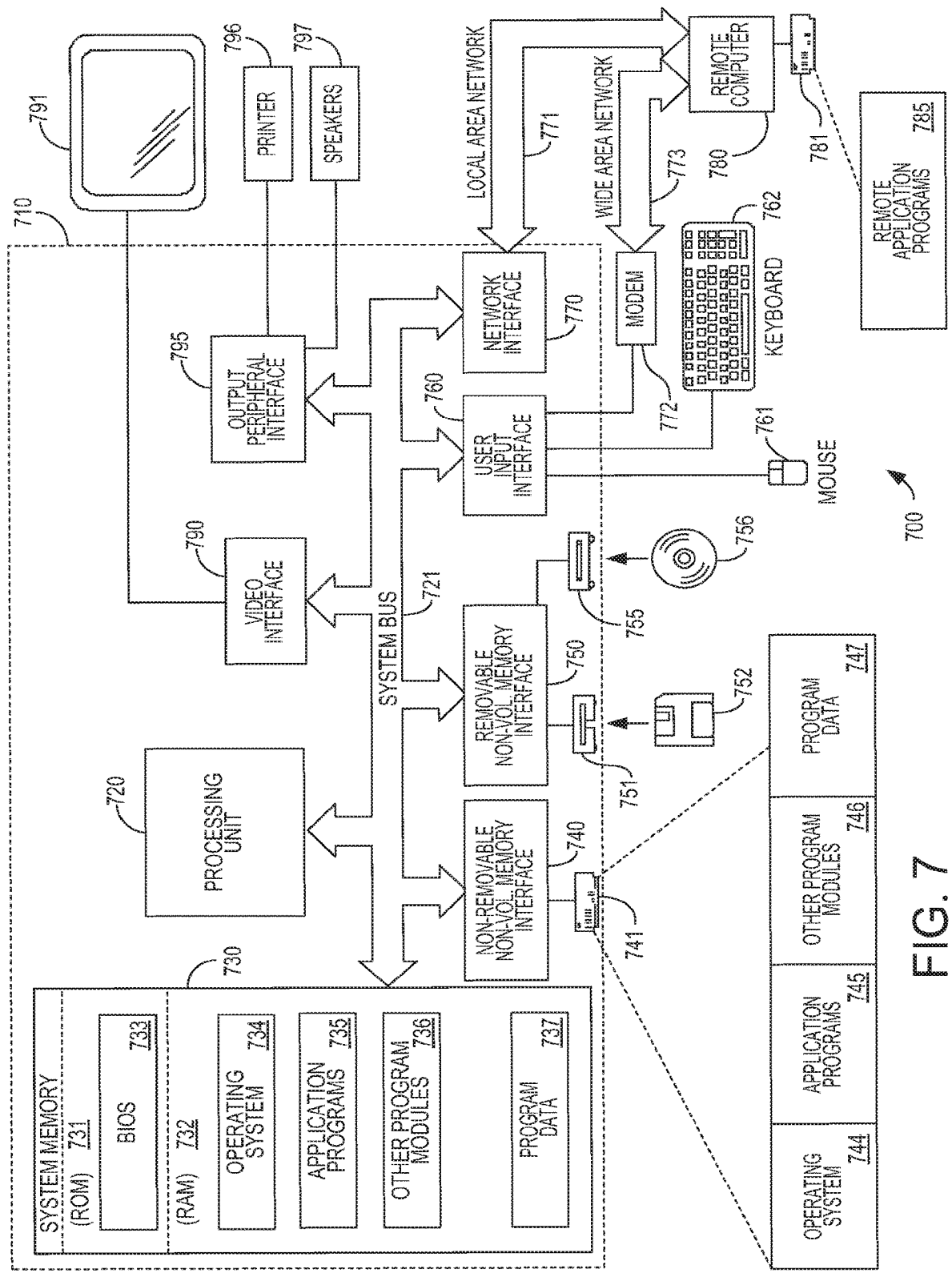
FIG. 7 shows an illustrative example of a computing system environment in which various inventive aspects of the present disclosure may be implemented.

FIG. 7 shows an illustrative example of a computing system environment 700 in which various inventive aspects of the present disclosure may be implemented. This computing system may be representative of a computing system that allows a suitable control system to implement the described techniques. However, it should be appreciated that the computing system environment 700 is only one example of a suitable computing environment and is not intended to suggest any limitation as to the scope of use or functionality of the described embodiments. Neither should the computing environment 700 be interpreted as having any dependency or requirement relating to any one or combination of components illustrated in the illustrative operating environment 700.

The embodiments are operational with numerous other general purpose or special purpose computing system environments or configurations. Examples of well-known computing systems, environments, and/or configurations that may be suitable for use with the described techniques include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc., that perform particular tasks or implement particular abstract data types. The embodiments may also be practiced in distributed computing environments where tasks are performed by remote processing devices that are linked through a communications network. In a distributed computing environment, program modules may be located in both local and remote computer storage media including memory storage devices.

With reference to FIG. 7, an illustrative system for implementing the described techniques includes a general purpose computing device in the form of a computer 710.

Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, touchscreen, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are illustrative and other means of establishing a communications link between the computers may be used.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation comprises at least one processor-readable storage medium (i.e., at least one tangible, non-transitory processor-readable medium, e.g., a computer memory (e.g., hard drive, flash memory, processor working memory, etc.), a floppy disk, an optical disc, a magnetic tape, or other tangible, non-transitory computer-readable medium) encoded with a computer program (i.e., a plurality of instructions), which, when executed on one or more processors, performs at least the above-discussed functions. The processor-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed functionality.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments of the invention, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. An apparatus comprising:
    a 3-dimensional (3D) display device configured to create for a user a visual illusion of a 3D scene, the 3D scene having perceived depth in a z-direction perpendicular to a physical screen having width in an x-direction and height in a y-direction;
a first sensor device configured to sense a physical location of a first anatomical feature of the user;
    a second sensor device configured to sense a physical location of a second anatomical feature of the user in close proximity to the 3D display device;
at least one processor; and
    at least one non-transitory processor-readable storage medium storing processor-executable instructions that, when executed by the at least one processor, cause the at least one processor to perform:
        detecting a distance between an origin position on the screen and the physical location of the first anatomical feature of the user sensed by the first sensor device;
        generating the 3D scene as a view from a virtual 3D camera toward an origin position in a virtual 3D model comprising a plurality of virtual components, the generating comprising locating the virtual 3D camera at a virtual camera location whose distance Z from the origin position in the virtual 3D model is specified based on the detected distance between the origin position on the screen and the physical location of the first anatomical feature of the user;
        mapping the virtual camera location to a physical location at coordinates (x,y,z)=(0,0,Z) from the origin position on the screen, and computing corresponding coordinates for a location of a first virtual component in the 3D scene;
        applying a transformation to (a) the coordinates of the first virtual component and/or (b) the physical location of the second anatomical feature of the user sensed by the second sensor device, based on a difference between the mapped physical location of the virtual 3D camera and the physical location of the first anatomical feature of the user as sensed by the first sensor device, to compare the physical location of the second anatomical feature of the user and the location of the first virtual component in a user-view space; and
        detecting an intended interaction between the second anatomical feature of the user and the first virtual component when the physical location of the second anatomical feature of the user as sensed by the second sensor device approaches the location of the first virtual component in the user-view space resulting from the transformation.

2. The apparatus of claim 1, wherein the first anatomical feature of the user is located on the user's head.

3. The apparatus of claim 2, wherein the first anatomical feature of the user is at least one eye of the user.

4. The apparatus of claim 1, wherein the second anatomical feature of the user is located on the user's hand.

5. The apparatus of claim 1, wherein the second sensor device is a contactless sensor device.

6. The apparatus of claim 1, wherein the processor-executable instructions further cause the at least one processor to perform:
    detecting a change in the physical location of the first anatomical feature of the user sensed by the first sensor device; and
    updating the 3D scene at least in part by:
        changing the virtual camera location in accordance with the change in the physical location of the first anatomical feature of the user as sensed by the first sensor device; and
        changing a field-of-view setting for the virtual 3D camera in accordance with a change in the distance between the origin position on the screen and the physical location of the first anatomical feature of the user sensed by the first sensor device.

7. The apparatus of claim 1, wherein the processor-executable instructions further cause the at least one processor to perform:
detecting a change in the physical location of the first anatomical feature of the user sensed by the first sensor device; and
updating the 3D scene at least in part by changing three-dimensional coordinates of the virtual camera location in accordance with respective three-dimensional components of the change in the physical location of the first anatomical feature of the user as sensed by the first sensor device.

8. The apparatus of claim 1, wherein the processor-executable instructions further cause the at least one processor to perform:
detecting a change in the physical location of the first anatomical feature of the user sensed by the first sensor device; and
updating the 3D scene at least in part by:
separating the detected change in the physical location of the first anatomical feature of the user into at least first and second components; and
fixing a first coordinate of the virtual camera location corresponding to the first component of the detected change in the physical location of the first anatomical feature of the user, while changing at least a second coordinate of the virtual camera location in accordance with at least the second component of the detected change in the physical location of the first anatomical feature of the user.

9. The apparatus of claim 1, wherein the processor-executable instructions further cause the at least one processor to perform:
detecting a change in viewpoint orientation of the first anatomical feature of the user; and
updating the 3D scene at least in part by changing a viewpoint orientation of the virtual 3D camera in accordance with the change in viewpoint orientation of the first anatomical feature of the user.

10. An apparatus comprising:
a 3-dimensional (3D) display device configured to create for a user a visual illusion of a 3D scene, the 3D scene having perceived depth in a z-direction perpendicular to a physical screen having width in an x-direction and height in a y-direction;
at least one sensor device configured to sense a physical location of an anatomical feature of the user;
at least one processor; and
at least one non-transitory processor-readable storage medium storing processor-executable instructions that, when executed by the at least one processor, cause the at least one processor to perform:
detecting a distance between an origin position on the screen and the physical location of the anatomical feature of the user sensed by the at least one sensor device;
generating the 3D scene as a view from a virtual 3D camera toward an origin position in a virtual 3D model comprising a plurality of virtual components, the generating comprising locating the virtual 3D camera at a virtual camera location whose distance from the origin position in the virtual 3D model is specified based on the detected distance between the origin position on the screen and the physical location of the anatomical feature of the user;
detecting a change in the physical location of the anatomical feature of the user sensed by the at least one sensor device, resulting in a change in the distance between the origin position on the screen and the physical location of the anatomical feature of the user; and
updating the 3D scene at least in part by changing the virtual camera location, at least in part by changing the virtual camera location's distance from the origin position in the virtual 3D model in accordance with the change in the distance between the origin position on the screen and the physical location of the anatomical feature of the user as sensed by the at least one sensor device, wherein changing the virtual camera location comprises:
separating the detected change in the physical location of the anatomical feature of the user into at least first and second components; and
fixing a first coordinate of the virtual camera location corresponding to the first component of the detected change in the physical location of the anatomical feature of the user, while changing at least a second coordinate of the virtual camera location in accordance with at least the second component of the detected change in the physical location of the anatomical feature of the user.

11. The apparatus of claim 10, wherein the anatomical feature of the user is located on the user's head.

12. The apparatus of claim 11, wherein the anatomical feature of the user is at least one eye of the user.

13. The apparatus of claim 10, wherein updating the 3D scene further comprises changing a field-of-view setting for the virtual 3D camera in accordance with the change in the distance between the origin position on the screen and the physical location of the anatomical feature of the user sensed by the at least one sensor device.

14. The apparatus of claim 10, wherein the processor-executable instructions further cause the at least one processor to perform:
detecting a change in viewpoint orientation of the anatomical feature of the user; and
updating the 3D scene at least in part by changing a viewpoint orientation of the virtual 3D camera in accordance with the change in viewpoint orientation of the anatomical feature of the user.

15. An apparatus comprising:
a 3-dimensional (3D) display device configured to create for a user a visual illusion of a 3D scene, the 3D scene having perceived depth in a z-direction perpendicular to a physical screen having width in an x-direction and height in a y-direction;
at least one sensor device configured to sense a viewpoint orientation of an anatomical feature of the user;
at least one processor; and
at least one non-transitory processor-readable storage medium storing processor-executable instructions that, when executed by the at least one processor, cause the at least one processor to perform:
generating the 3D scene as a view from a virtual 3D camera having a viewpoint orientation toward an origin position in a virtual 3D model comprising a plurality of virtual components;
detecting a change in the viewpoint orientation of the anatomical feature of the user sensed by the at least one sensor device; and
updating the 3D scene at least in part by changing the viewpoint orientation of the virtual 3D camera away from the origin position in the virtual 3D model, in accordance with the detected change in the viewpoint orientation of the anatomical feature of the user as sensed by the at least one sensor device.

16. The apparatus of claim 14, wherein the anatomical feature of the user is located on the user's head.

17. The apparatus of claim 15, wherein the anatomical feature of the user is at least one eye of the user.

18. The apparatus of claim 14, wherein the processor-executable instructions further cause the at least one processor to perform:
   detecting a change in physical location of the anatomical feature of the user; and
   updating the 3D scene at least in part by changing three-dimensional coordinates of a virtual camera location of the virtual 3D camera in accordance with respective three-dimensional components of the change in the physical location of the anatomical feature of the user.

* * * * *